(12) United States Patent
Ghanem

(10) Patent No.: US 12,226,911 B2
(45) Date of Patent: *Feb. 18, 2025

(54) RECONFIGURABLE, FIXTURELESS MANUFACTURING SYSTEM AND METHOD

(71) Applicant: George K. Ghanem, Columbus, OH (US)

(72) Inventor: George K. Ghanem, Columbus, OH (US)

(*) Notice: Subject to any disclaimer, the term of this patent is extended or adjusted under 35 U.S.C. 154(b) by 167 days.

This patent is subject to a terminal disclaimer.

(21) Appl. No.: 18/073,675

(22) Filed: Dec. 2, 2022

(65) Prior Publication Data

US 2023/0101387 A1 Mar. 30, 2023

Related U.S. Application Data

(63) Continuation of application No. 16/664,443, filed on Oct. 25, 2019, now Pat. No. 11,559,897.

(60) Provisional application No. 62/751,014, filed on Oct. 26, 2018.

(51) Int. Cl.
*B25J 9/16* (2006.01)
*G05B 19/418* (2006.01)

(52) U.S. Cl.
CPC .......... *B25J 9/1682* (2013.01); *B25J 9/1612* (2013.01); *B25J 9/1697* (2013.01); *G05B 19/41875* (2013.01); *G05B 2219/37567* (2013.01); *G05B 2219/50125* (2013.01); *G05B 2219/50393* (2013.01)

(58) Field of Classification Search
None
See application file for complete search history.

(56) References Cited

U.S. PATENT DOCUMENTS

| | | | |
|---|---|---|---|
| 5,771,553 | A | 6/1998 | Sim et al. |
| 5,848,747 | A | 12/1998 | Nishi |
| 6,273,483 | B1 | 8/2001 | Bone |
| 6,381,556 | B1 | 4/2002 | Kazemi |
| 8,180,487 | B1 | 5/2012 | Vangal-Ramamurthy et al. |

(Continued)

FOREIGN PATENT DOCUMENTS

| | | |
|---|---|---|
| WO | 2005087451 A1 | 9/2005 |
| WO | 2005105389 A1 | 11/2005 |
| WO | WO2009140977 A1 | 11/2009 |

OTHER PUBLICATIONS

Wired, How the Tesla Model S is Made—Tesla Motors Part 1 youtube video webpage, Jul. 16, 2013, 2 pages.

*Primary Examiner* — Jaime Figueroa
*Assistant Examiner* — Arslan Azhar
(74) *Attorney, Agent, or Firm* — Standley Law Group LLP; Jeffrey S. Standley; Adam J. Smith

(57) ABSTRACT

Systems and methods for reconfigurable, fixtureless manufacturing are provided. Material handling robots grasp and move parts within an assembly area to adjoin one another in a predetermined orientation. While the parts remain grasped and suspended within the assembly area, out of contact with any fixtures, work surfaces, jigs, and locators, a machine vision system performs an alignment scan to determine locations of datums on the parts which are transmitted to a controller for comparison against stored virtual datums for a subassembly comprising the joined parts. The location of the datums are transmitted to a joining robot which joins the parts to form the subassembly. The machine vision system performs an inspection scan of the datums on the parts after joining.

20 Claims, 21 Drawing Sheets

(56) References Cited

U.S. PATENT DOCUMENTS

| | | |
|---|---|---|
| 10,049,443 B2 | 8/2018 | Bartos et al. |
| 10,095,214 B2 | 10/2018 | Ghanem |
| 10,101,725 B2 | 10/2018 | Ghanem |
| 10,551,179 B2 | 2/2020 | Lonsberry et al. |
| 10,571,889 B2 | 2/2020 | Ghanem |
| 10,591,277 B2 | 3/2020 | Kallay et al. |
| 11,029,713 B2 | 6/2021 | Haven et al. |
| 2003/0139821 A1 | 7/2003 | Papadopoulos et al. |
| 2006/0153525 A1 | 7/2006 | Treves et al. |
| 2013/0329012 A1 | 12/2013 | Bartos et al. |
| 2014/0081458 A1 | 3/2014 | Shimono |
| 2014/0277733 A1 | 9/2014 | Kouno et al. |
| 2015/0104284 A1 | 4/2015 | Riedel |
| 2015/0120054 A1 | 4/2015 | Watanabe |
| 2015/0190926 A1 | 7/2015 | Miegel et al. |
| 2017/0052534 A1 | 2/2017 | Ghanem |
| 2018/0043540 A1 | 2/2018 | Satou |
| 2018/0120218 A1 | 5/2018 | Shultis et al. |
| 2019/0049920 A1 | 2/2019 | Ghanem |
| 2019/0076949 A1 | 3/2019 | Atherton et al. |
| 2019/0138009 A1 | 5/2019 | Saito |
| 2019/0143541 A1 | 5/2019 | Nemallan |
| 2019/0331480 A1 | 10/2019 | Lonsberry et al. |
| 2019/0332084 A1 | 10/2019 | Haven |
| 2020/0130189 A1 | 4/2020 | Ghanem |
| 2020/0240772 A1 | 7/2020 | Lonsberry et al. |
| 2020/0262057 A1 | 8/2020 | Saez et al. |
| 2020/0262078 A1 | 8/2020 | Saez et al. |
| 2020/0262079 A1 | 8/2020 | Saez et al. |
| 2020/0377004 A1 | 12/2020 | Zhang et al. |
| 2020/0377012 A1 | 12/2020 | Saez et al. |
| 2020/0380273 A1 | 12/2020 | Saez et al. |
| 2020/0398743 A1 | 12/2020 | Huber et al. |
| 2021/0150760 A1 | 5/2021 | Haven et al. |
| 2021/0237200 A1 | 8/2021 | Wang et al. |
| 2021/0237211 A1 | 8/2021 | Saez et al. |
| 2021/0237212 A1 | 8/2021 | Saez et al. |
| 2022/0152785 A1 | 5/2022 | Skurkis et al. |
| 2022/0176564 A1 | 6/2022 | Saez et al. |

DETAIL A

DETAIL B

RECONFIGURABLE, FIXTURELESS MANUFACTURING SYSTEM AND METHOD

CROSS-REFERENCE TO RELATED APPLICATIONS

This application is a continuation of U.S. Nonprovisional application Ser. No. 16/664,443 filed Oct. 25, 2019, which claims the benefit of U.S. Provisional Application Ser. No. 62/751,014 filed Oct. 26, 2018, the disclosures of each of which are hereby incorporated by reference as if fully restated.

TECHNICAL FIELD

Exemplary embodiments relate generally to a reconfigurable, fixtureless manufacturing system and method assisted by learning A.I. software.

BACKGROUND AND SUMMARY OF THE INVENTION

Dedicated hardware fixtures are often used to secure and locate sheet metal parts for welding. Such sheet metal parts may be welded together to create subassemblies, which may subsequently be used to make a larger product. A common example of where such processes are utilized is the automobile manufacturing industry. Regardless, a unique fixture must generally be designed and manufactured to accommodate each subassembly. While some so-called flexible fixture systems are available, the costs of designing and manufacturing such flexible fixture systems are significant due to the complexity of design required to accommodate even minor changes. Furthermore, even such flexible fixture systems may be quickly rendered obsolete upon the introduction of product changes. For example, without limitation, in the automobile industry, such fixture systems may need updating with each model or production line change. The average costs for fixturing in an automotive assembly plant is estimated to be $150-300 million every 3-4 years. The use of robots and other automated assembly systems to perform material handling and joining are known. For example, many Integrators of robots and automated assembly systems are available in various industries. As another example, robots and automated assembly systems using fixtures to provide physical datum points are known, such as are described in U.S. Pat. No. 10,095,214 issued Oct. 9, 2018 and U.S. Pat. No. 10,101,725 issued Oct. 16, 2018. While the use of such robots and automated assembly systems may reduce certain expenses and provide improved consistency in manufacturing, what is needed is the ability to utilize learning A.I. software to replace fixtures and physical datums with virtual datums.

In accordance with the present invention, a reconfigurable, fixtureless manufacturing system and method assisted by learning A.I. software is provided. One or more material handling robots may be provided at an assembly area. The assembly area may be located within a manufacturing facility, for example without limitation. One or more joining robots may be provided at the assembly area. Each of the material handling robots may be configured to selectively engage any of a number of material handling devices. Each of the material handling devices may comprise one or more gripping elements gripping elements, grippers, clamps, some combination thereof, or the like. gripping elements Each of the material handling devices may be configured to grasp a number of differently shaped parts. In exemplary embodiments, such parts are grasped by inserting a first gripping element of a given material handling device into a locating hole on the part and pressing a second and third gripping element against walls of the part, preferably on opposing sides of the locating hole.

A given material handling robot may grasp a given part with a given material handling device and may move the part to a particular location within the assembly area where the material handling device may be replaced from the material handling robot in order to accommodate a different part's family sizes and shapes. In other exemplary embodiments, the material handling robot may instead hold the material handling device at the particular location within the assembly area. In exemplary embodiments, a number of parts may be stacked or otherwise adjoined to one another to form a subassembly within the assembly area. Such parts may be stacked or otherwise adjoined at a docking station. The docking station may be placed atop an autonomous guide vehicle (AGV) or mounted to the floor.

A machine vision system may perform an alignment scan of the subassembly. The machine vision system may be configured to capture the location of selected datums of the subassembly. The datums may be particular features of or locations on the subassembly. The machine vision system may transmit the location of such datums to a controller. The controller may compare the location of the scanned datums with predetermined locations to determine a best fit for the parts to create the subassembly stored at the learning A.I. software. If needed, the parts may be adjusted spatially. The process for determining the best fit and providing spatial adjustment may be as shown and described in U.S. Pat. No. 10,095,214 issued Oct. 9, 2018 and U.S. Pat. No. 10,101,725 issued Oct. 16, 2018, which are hereby incorporated by reference herein in their entireties. The one or more joining robots may join the parts, such as by welding, fastening, or riveting, some combination thereof, or the like to complete the subassembly. The material handling device and/or the material handling robots may be disabled from movement during the joining process to apply breaking effect, other methods can also be utilized to apply breaking to hold parts in position while joining. The machine vision system may perform an inspection scan of the completed subassembly. Any discrepancies between the inspection scan and the alignment scan may be transmitted to the learning A.I. software by way of the controller. Additional methods include embedding the best fit A.I. algorithms directly in the camera processor or in the robot controller software to minimize and eliminate additional hardware and cabling. The learning A.I. software may be configured to adjust the stored datums to compensate for such discrepancies when producing the next subassembly. This machine learning process may permit optimization of the assembly process through multiple production iterations of a given subassembly. The flexibility of the material handling devices and the use of the learning A.I. software may provide the ability to use the same, or a substantially similar, system to handle and join a number of differently shaped, sized, arranged, or the like, parts in a number of different orientations to produce a number of differently shaped, sized, arranged, or the like, subassemblies or assemblies which may be improved through each manufacturing iteration. Furthermore, the use of material handling robots and material handling devices to secure the parts may provide a fixtureless assembly process. By storing the virtual datums, the need for a physical fixture to provide physical datum points may be eliminated or significantly reduced.

In exemplary embodiments, one or more components of the machine vision system may be configured to determine if a worker or other individual is within the assembly area. Movement of the material handling robots may be prevented or halted while the individual is within the assembly area. The material handling robots may be configured to grasp one or more parts and move them into an assembly position for an inspection scan be the machine vision system to verify that certain features are present and properly aligned. In such embodiments, the reconfigurable manufacturing systems and methods may operate for part inspection and verification and joining need not necessarily be performed, though subsequent joining is contemplated.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

and

Figure 13:
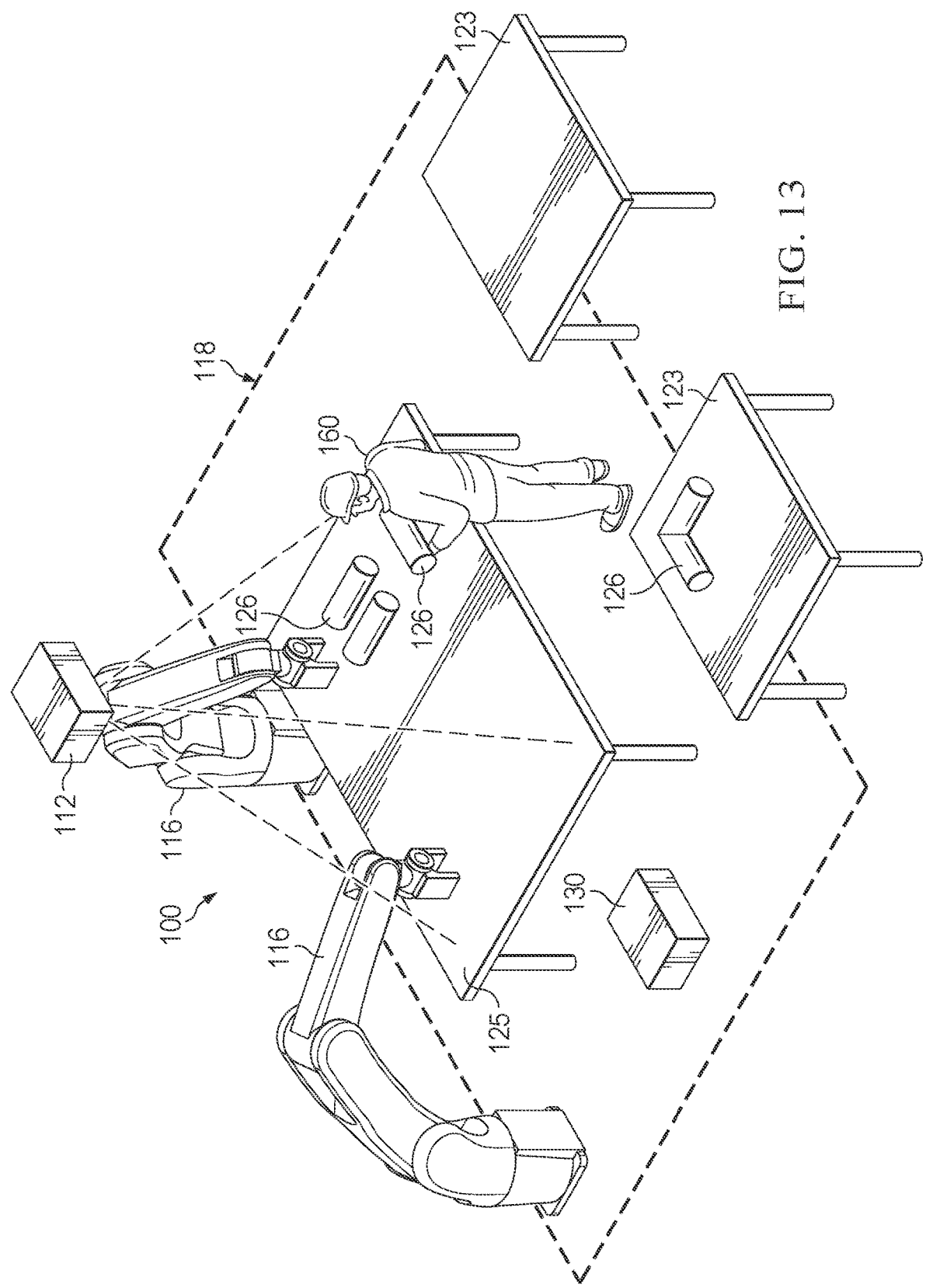
FIG. 13 is a perspective view of another exemplary AI driven reconfigurable manufacturing system of the present invention with A.I. learning.
Figure 18:
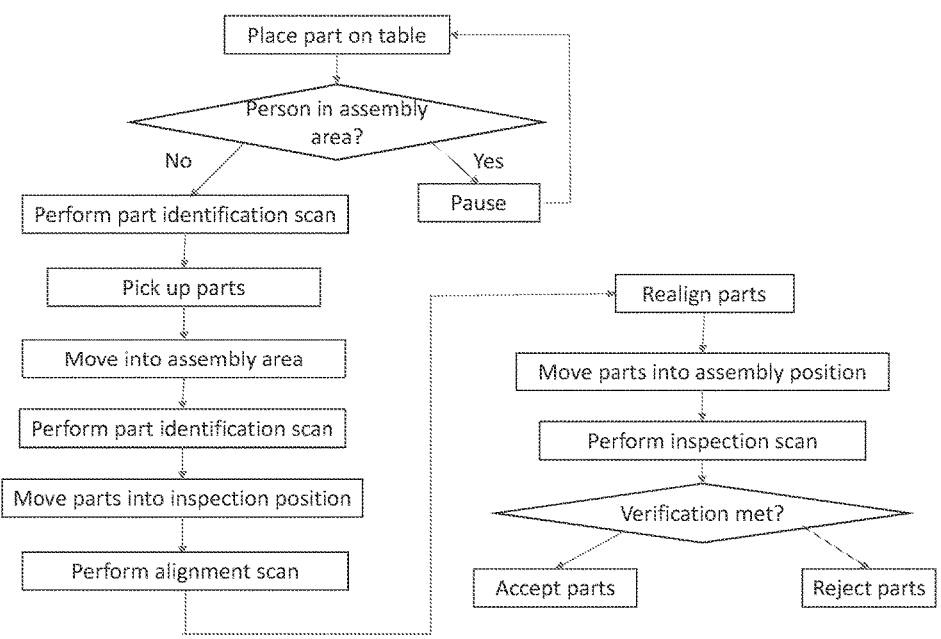

FIG. 18 is a flowchart with exemplary logic for operating the system of FIG. 13 in accordance with the present invention.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
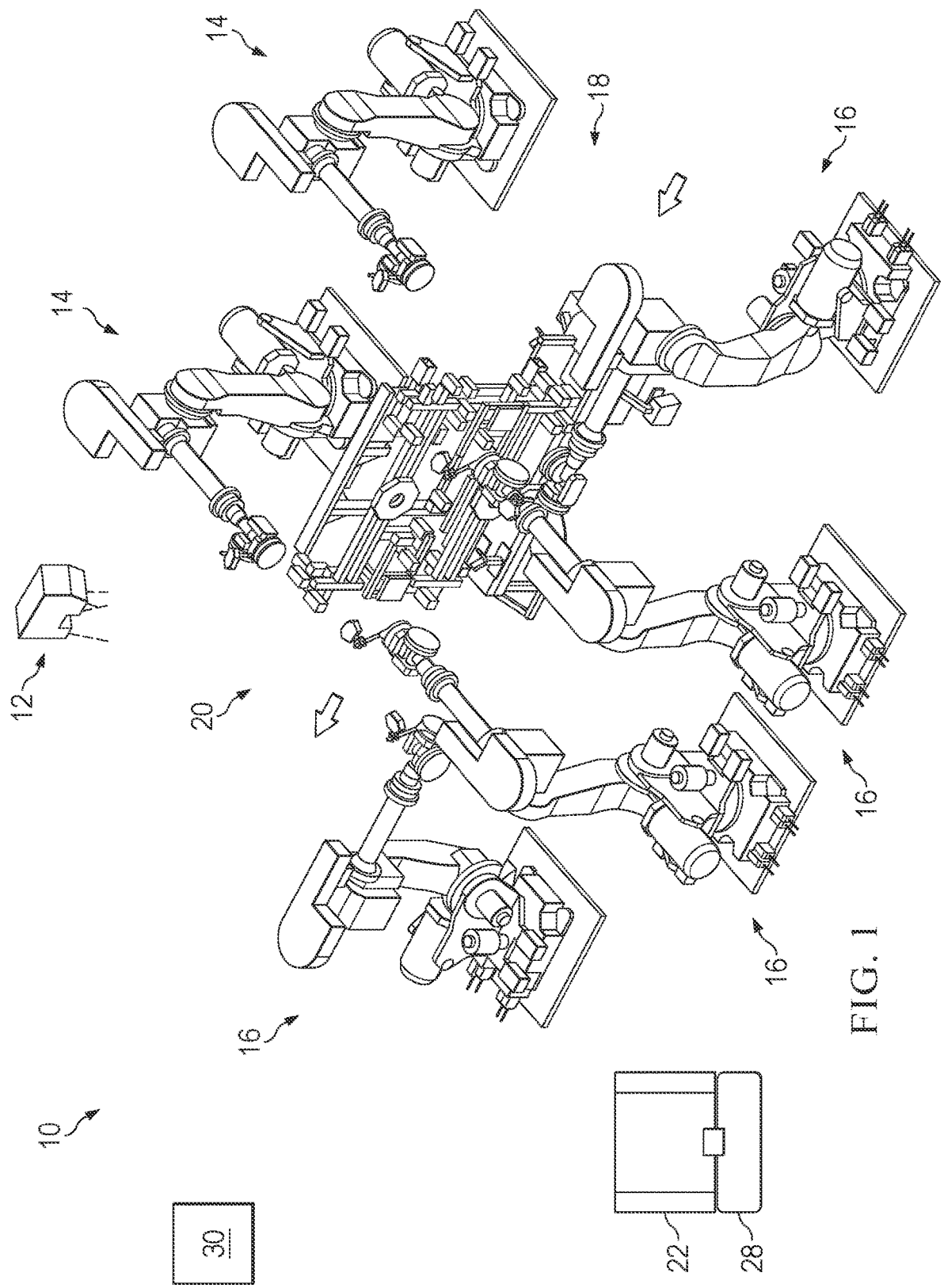
FIG. 1 is a perspective view of an exemplary A.I. driven reconfigurable/fixtureless manufacturing system of the present invention.

FIG. 1 illustrates an exemplary AI driven fixtureless and reconfigurable manufacturing system 10. The system 10 may comprise a machine vision system 12. The machine vision system 12 may comprise one or more cameras, lasers, radar, proximity detectors, ultrasonic, photo eyes, some combination thereof, or the like. Any location, number, orientation, arrangement, and the like of components of the machine vision system 12 is contemplated.

The system 10 may comprise one or more joining robots 14. The joining robots 14 may have a material handling end of arm tooling that be configured for movement in nine dimensions (degrees of freedom). The joining robots 14 may be configured to perform welding, fastening, riveting, connecting, joining, some combination thereof, or like functions. In exemplary embodiments, the joining robots 14 may be configured to selectively receive any one of a number of joining devices 34. Each joining device 34 may be configured to perform one or more particular joining techniques. For example, without limitation, a given joining device 34 may comprise a welding torch, a screw driver, a riveter, adhesive gun, some combination thereof, or other similar connection tool functions. In other exemplary embodiments, such joining devices 34 may be permanently attached to the joining robots 14. Although two joining robots 14 are illustrated in FIG. 1, any number of joining robots 14 are contemplated of the same or different types. Using the geometry datum setting A.I., allows the joining robots 14 and the material handling robots 16 to be arranged in various ways, depending on the complexity of the part assemblies in order to handle a complete parts family without changing of the physical layout and removing part dedicated tooling figures, around an assembly area 18.

The system 10 may comprise one or more material handling robots 16. The material handling robots 16 may have an end of arm tooling that can be configured for movement in 9 dimensions (degrees of freedom). In exemplary embodiments, the material handling robots 16 may be configured to handle any one of a number of material handling devices 32. Each material handling device 32 may be configured to grasp any one of a number of parts. In other exemplary embodiments, such material handling devices 32 may be attached to the material handling robots 16. Although four material handling robots 16 are illustrated in FIG. 1, any number of material handling robots 16 are contemplated of the same or different types. The material handling robots 16 may be arranged around the assembly area 18.

The joining robots 14 and material handling robots 16 may be arranged to perform operations on a subassembly 20 located within the assembly area 18. The machine vision system 12 may be positioned to view some or all of the assembly area 18. The machine vision system 12 may be within sufficient proximity and view of the assembly area 18 to be capable of optically scanning the subassembly 20. In exemplary embodiments, the subassembly 20 may be transported into and out of the assembly and weld areas 18 by way of an AGV 28, though any type of transportation for the subassembly 20 is contemplated.

One or more bins 22 may be positioned around the assembly area 18. Each of the bins 22 may be configured to hold one or more types of parts 26. In exemplary embodiments, at least one bin 22 may be placed in reach of each of the material handling robots 16, though any number and arrangement of the bins 22 is contemplated. Each of the bins 22, in exemplary embodiments, may be tugged by and material handling AGV (not illustrated here) so that the bin 22 is moveable. For example, without limitation, the material handling AGV may move a given bin 22 to be in reach of a given material handling robot 16 and subsequently move the given bin 22 to be in reach of another material handling robot 16.

In exemplary embodiments, the machine vision system 12, each of the material handling robots 16, each of the joining robots 14, each of the bins 22, and various components thereof may be in electronic communication with a controller 30. Such communication may be accomplished by wired connections, wireless connections, some combination thereof, or the like. The controller 30 may comprise one or more electronic storage devices and one or more processors. Executable learning A.I. software instructions may be stored at the one or more electronic storage devices which when executed by the one or more processors configure the one or more processors to perform the functions and steps described herein. It is also feasible to install the executable learning A.I. in an industrial PC, a camera, as part of robot software directly or indirectly, and other devices that may communicate with the controller 30 or have a more direct communications with the actuators or manipulator arms (servo slides, or robots).

Figure 2:
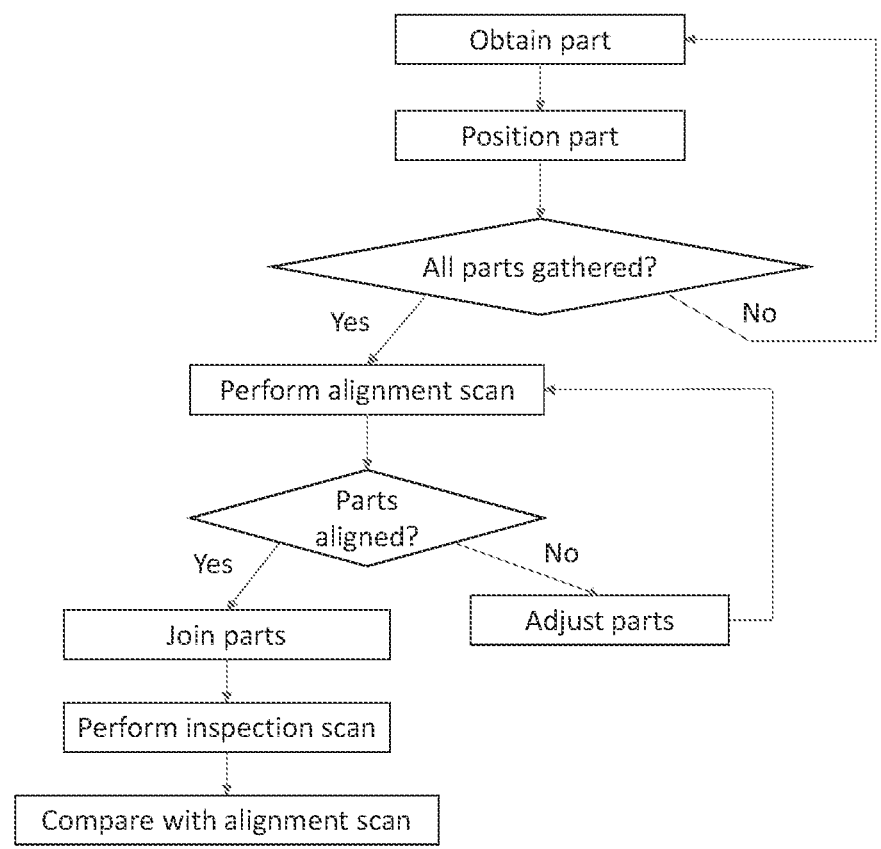
FIG. 2 is a flow chart with exemplary logic for use with the system of FIG. 1.

FIG. 2 illustrates an exemplary logic for operating the and AI driven fixtureless and reconfigurable manufacturing system 10. Each part 26 for a given subassembly 20 may be obtained. In exemplary embodiments, the parts 26 may be stored in, and obtained from, a respective part bin 22, though multiple types of parts may be stored in a given part bin 22. Each part 26 may be locatable by way of an RFID chip, an optically scannable code, an indicator, a datum 40, some combination thereof, or the like. In exemplary embodiments, each of the material handling robots 16 and/or material handling devices 32 may comprise a component of the machine vision system 12 for identifying the part 26 for grasping. The datums 40 may be particular features of, or locations on, the parts 26 or the subassembly 20 which may be stored to product virtual datums 40. Virtual datums 40 may be stored at the controller 30 that represent the location of datums 40 of a properly joined subassembly 20. The learning A.I. algorithms has the ability to handle hundreds of feature datum geometry settings at the same time.

A given material handling robot 16 may secure a given material handling device 32 to itself. A given part 26 may be gripped by the material handling device 32 secured to the material handling robot 16. The material handling robot 16 may move the part 26 and the material handling device 32 to a particular location within the assembly area 18. In exemplary embodiments, the material handling device 32 holding the part 26 may place that part at a docking station 24. This part may be a primary part. After positioning on the docking station, using camera and AI, other parts can be placed relative to the primary part. This improves the subassembly quality due to part-to-part variation and tooling variation due to usage and tear and ware. The docking station 24 may be positioned on the floor or on an AGV 28 has been moved into the assembly area 18. Additional parts 26 may be gathered following substantially the same or similar steps as needed to compete the subassembly 20.

During, or as, all parts 26 are gathered, the machine vision system 12 may perform an alignment scan of the subassembly 20. The various parts 26 may comprise one or more datums 40 in the form of features of the various parts 26, such as but not limited to, locating apertures 19, edges, curved surfaces, protrusions, depressions, some combination thereof, or the like. The location of the datums 40 may be transmitted to the controller 30 where the learning AI algorithm may reside. The AI compares the location of the scanned datums 40 with the location of stored virtual datums 40 to determine a best fit for the parts to create the subassembly stored at the learning A.I. software. This feedback inspection information will be used by the AI in the following cycle to improve the quality and fit of the following subassembly during the next build cycle. The various parts 26 may be adjusted by the material handling devices 32 and/or the material handling robots 16 as needed. If adjustment is performed, the subassembly 20 may be rescanned and further adjustments may be made as needed. The process for determining the best fit and providing spatial adjustment may be as shown and described in U.S. Pat. No. 10,095,214 issued Oct. 9, 2018 and U.S. Pat. No. 10,101,725 issued Oct. 16, 2018, which are hereby incorporated by reference herein in their entireties.

The subassembly 20 may be secured. The subassembly 20 may be secured prior to, while, or after performing the alignment scan. In exemplary embodiments, the subassembly 20 may be secured by activating brakes on the material handling devices 32 and/or the material handling robots 16. Alternatively, or additionally, the subassembly 20 may be secured by deactivating motors on the material handling devices 32 and/or the material handling robots 16. Another approach is the utilization of gripping system that can allow the part to be kinematically held without the use of excessive force or the use of a breaking mechanism.

The position of the datums 40 of the various parts 26 as detected by the machine vision system 12 may be transmitted to the joining robots 14. The various parts 26 of the subassembly 20 may be joined by the joining robots 14. The subassembly 20 may be, or may remain, secured during joining of the parts 26.

After joining the parts 26 to form a completed subassembly 20, the material handling devices 32 may be unsecured. The material handling devices 32 may be removed from the assembly area 18 by the material handling robots 16. An inspection scan may then be performed by the machine vision system 12 to locate the various datum 40. The location of the datums 40 from the inspection scan may be compared against the stored virtual datums 40 and/or the location of the datums 40 from the alignment scan to determine if any discrepancies arise. Such comparison may be performed at the controller 30, though any location is contemplated. Any discrepancies between the inspection scan and the alignment scan may be transmitted to the learning A.I. software by way of the controller 30. The learning A.I. software may be configured to compute the adjustment vectors needed to be applied to the parts to in order for the assembly to comply with the stored virtual datums 40 and to compensate for any discrepancies when producing the next subassembly 20 as further described herein. This machine learning process may permit optimization of the assembly process through multiple production iterations of a given subassembly 20. The flexibility of the material handling robots 16 and material handling devices 32 and the use of the learning A.I. software may provide the ability to use the same, or a substantially similar, system to handle and join a number of differently shaped, sized, arranged, or the like, parts 26 in a number of different orientations to produce a number of differently shaped, sized, arranged, or the like, subassemblies 20 or assemblies which may be improved through each manufacturing iteration. Furthermore, the use of material handling robots 16 and material handling devices 32 to secure the parts 26 may provide a true A.I. driven fixtureless assembly process. By storing the virtual datums 40 in the A.I. Software (virtually), the need for a physical fixture to provide physical datum points may be eliminated or significantly reduced.

Figure 3:
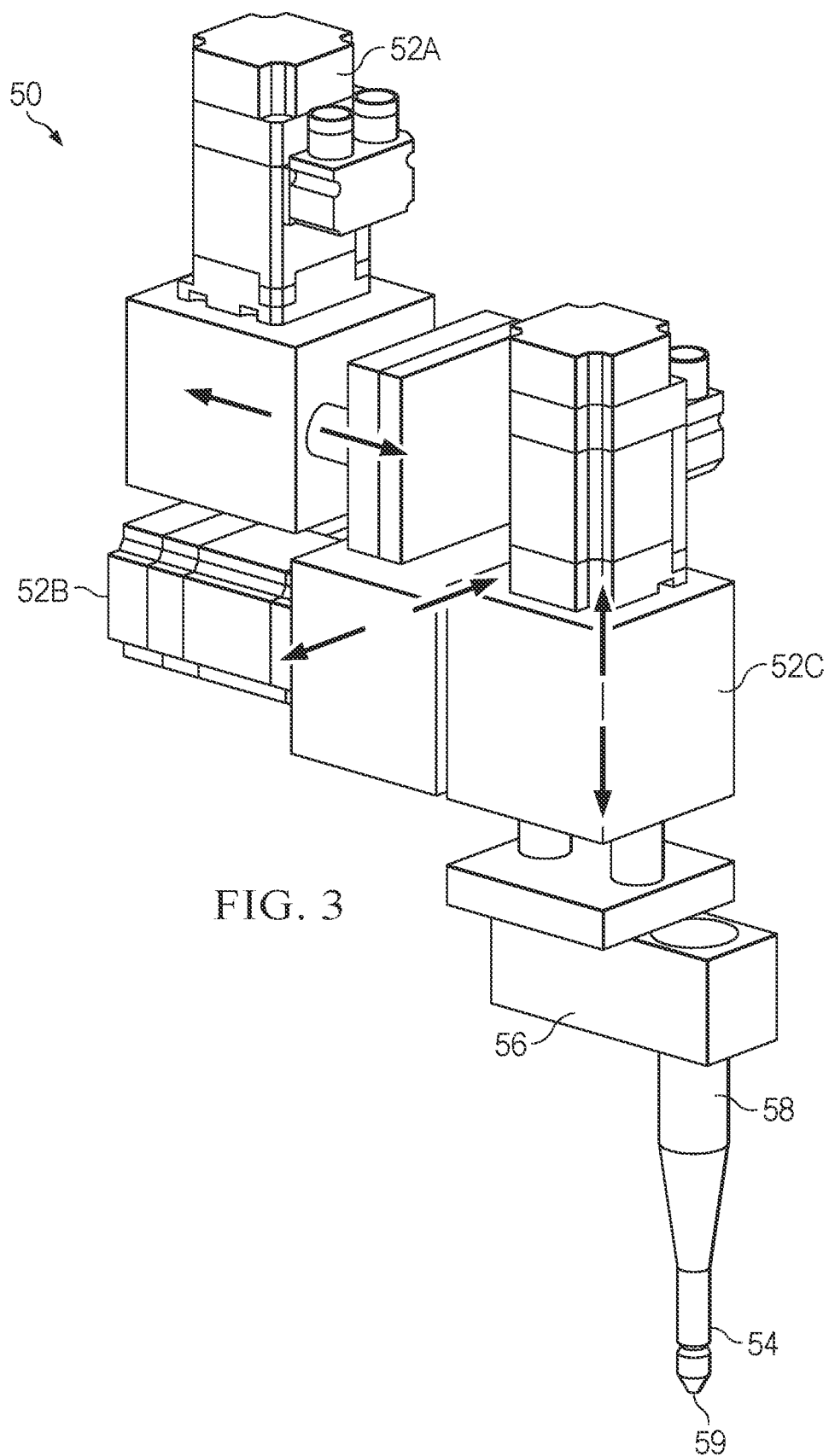
FIG. 3 is a perspective view of an exemplary gripping element of the present invention for use with the system of FIG. 1.

FIG. 3 illustrates an exemplary gripping element 50. Each of the material handling devices 32 may comprise one or more gripping elements 50. Each gripping element 50 may comprise one or more motors 52A-C, such as but not limited to, servos. Each motor 52A-C may be configured to move the gripping element 50 in a given dimension (e.g., x, y, or z plane or orientation). Three motors 52A-C may be used such that the gripping element 50 is capable of movement in three dimensions. Each gripping element 50 may comprise a base 56. Each gripping element 50 may comprise one or more protrusions 58. The protrusions 58 may extend from the base 56.

The base 56 may be substantially cuboid in shape, though any shape is contemplated. The protrusion 58 may comprise cylindrical and/or conical shaped sections. The protrusion 58 may comprise a ring-shaped indent 54 located near a tip 59 of the protrusion 58. Any size or shape protrusion 58 is contemplated including but not limited to, grippers, claws, tweezers, clamps, hooks, suction devices, vacuums, some combination thereof, or the like. Any number of protrusions 58 may be provided on a given base 56. The protrusion 58, the base 56, or other portions of the gripping element 50 may comprise one or more datums 40.

Figure 4:
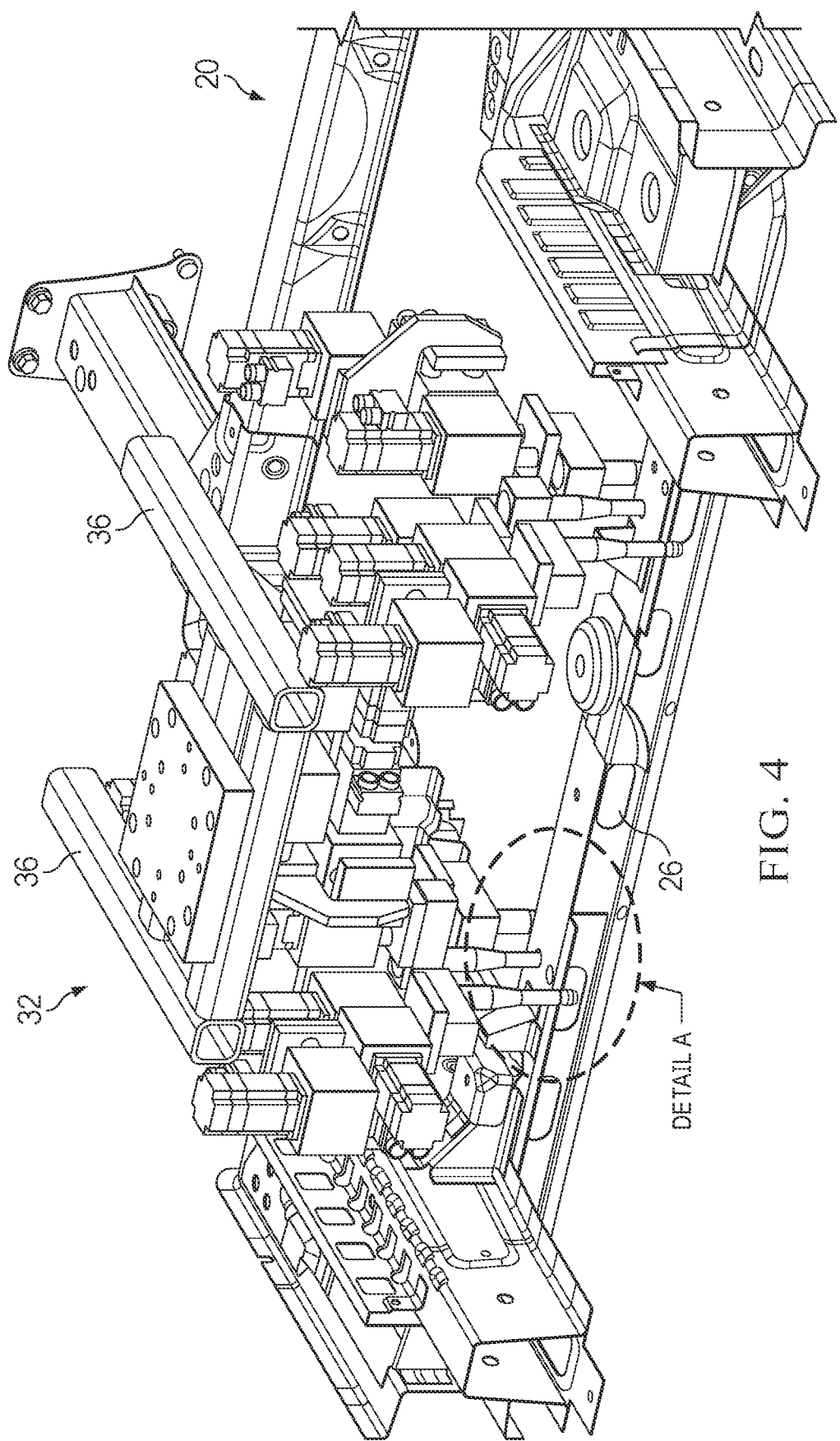
FIG. 4 is a perspective view of an exemplary material handling device for use with the system of FIG. 1, also indicating detail A.
Figure 5:
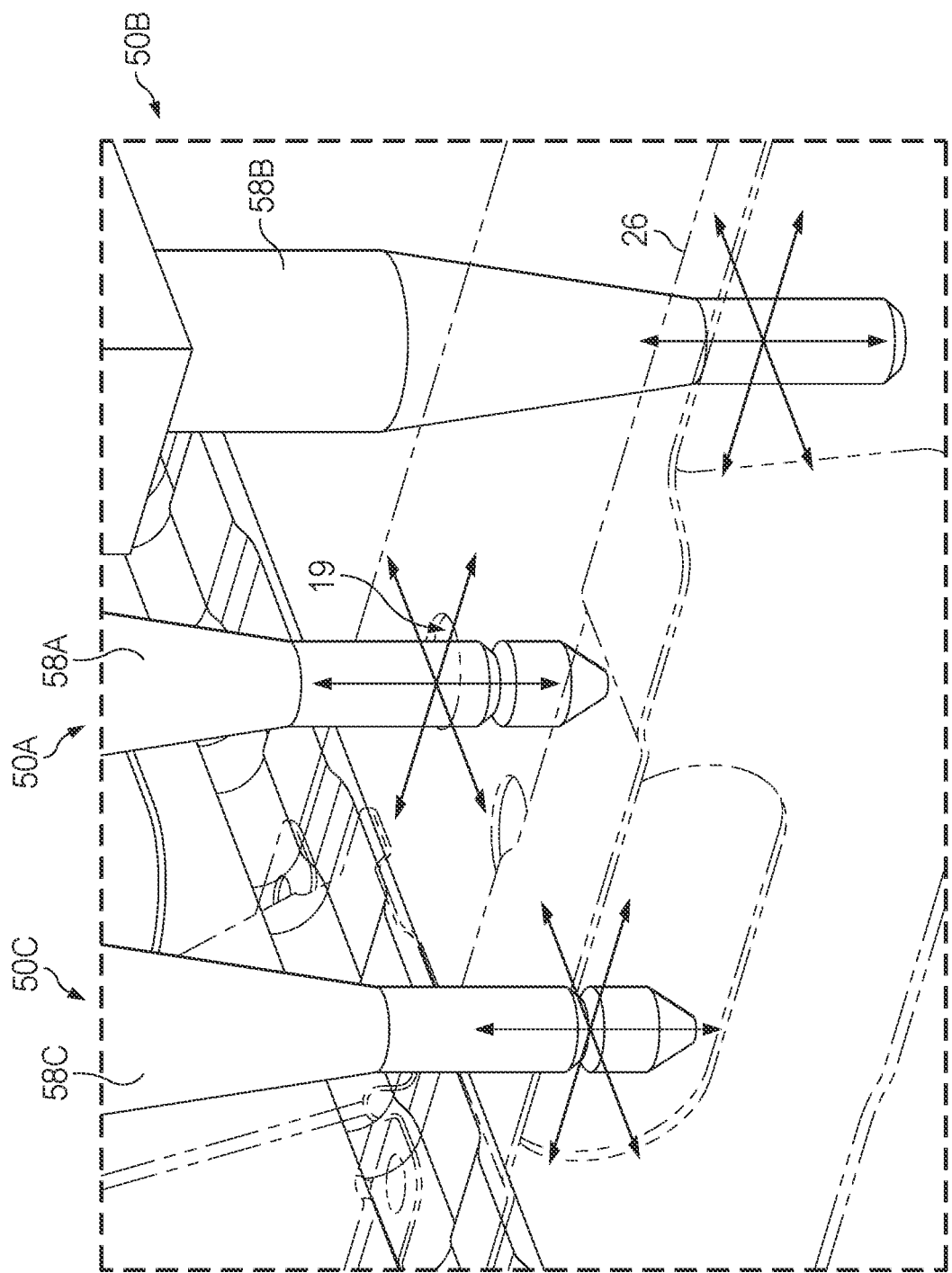
FIG. 5 is a detailed perspective view of detail A of FIG. 4 with the part rendered translucent so that additional components of the material handling device are visible.
Figure 6A:
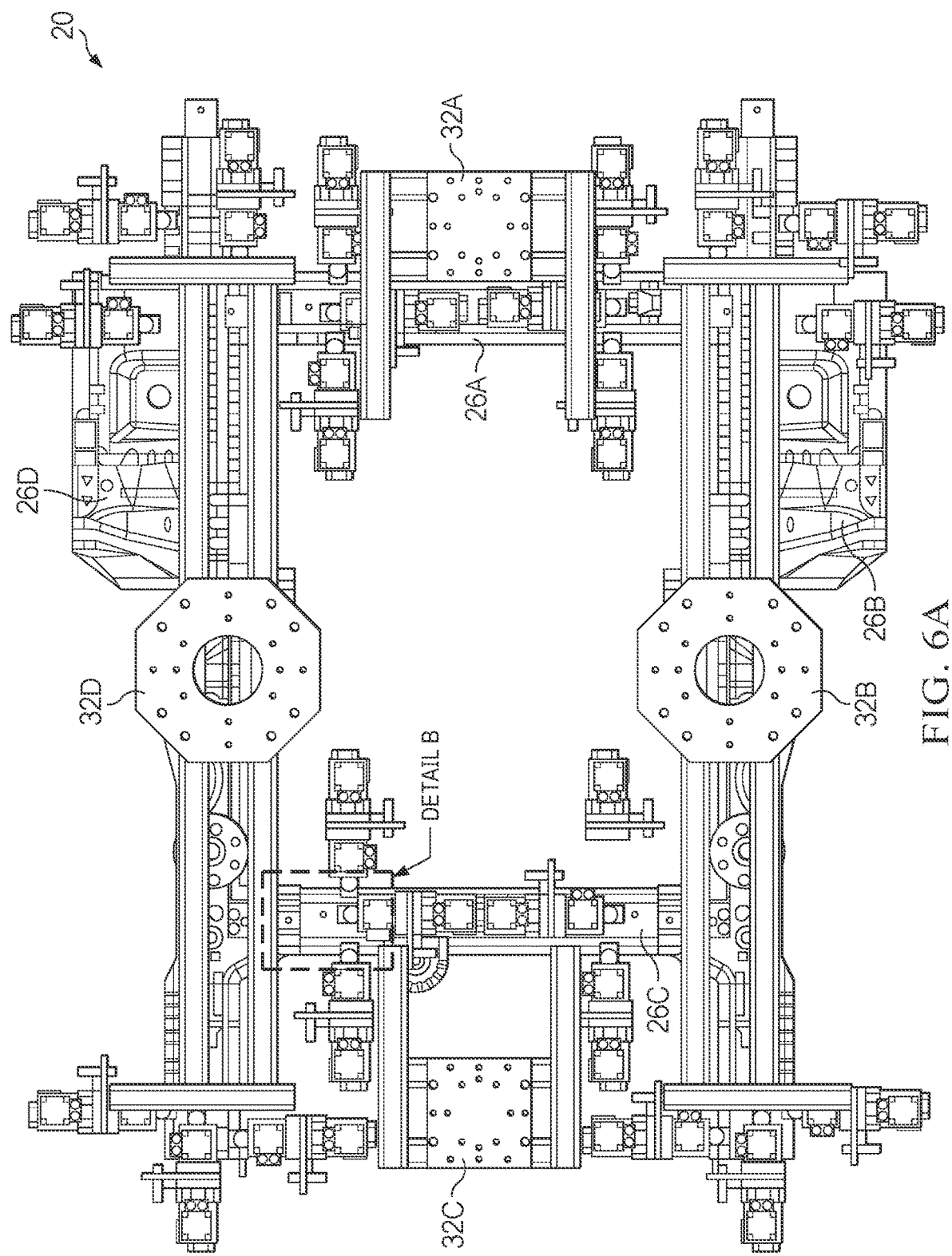
FIG. 6A is a top view of a subassembly and material handling devices of the system of FIG. 1 shown in isolation, also indicating detail B.
Figure 6B:
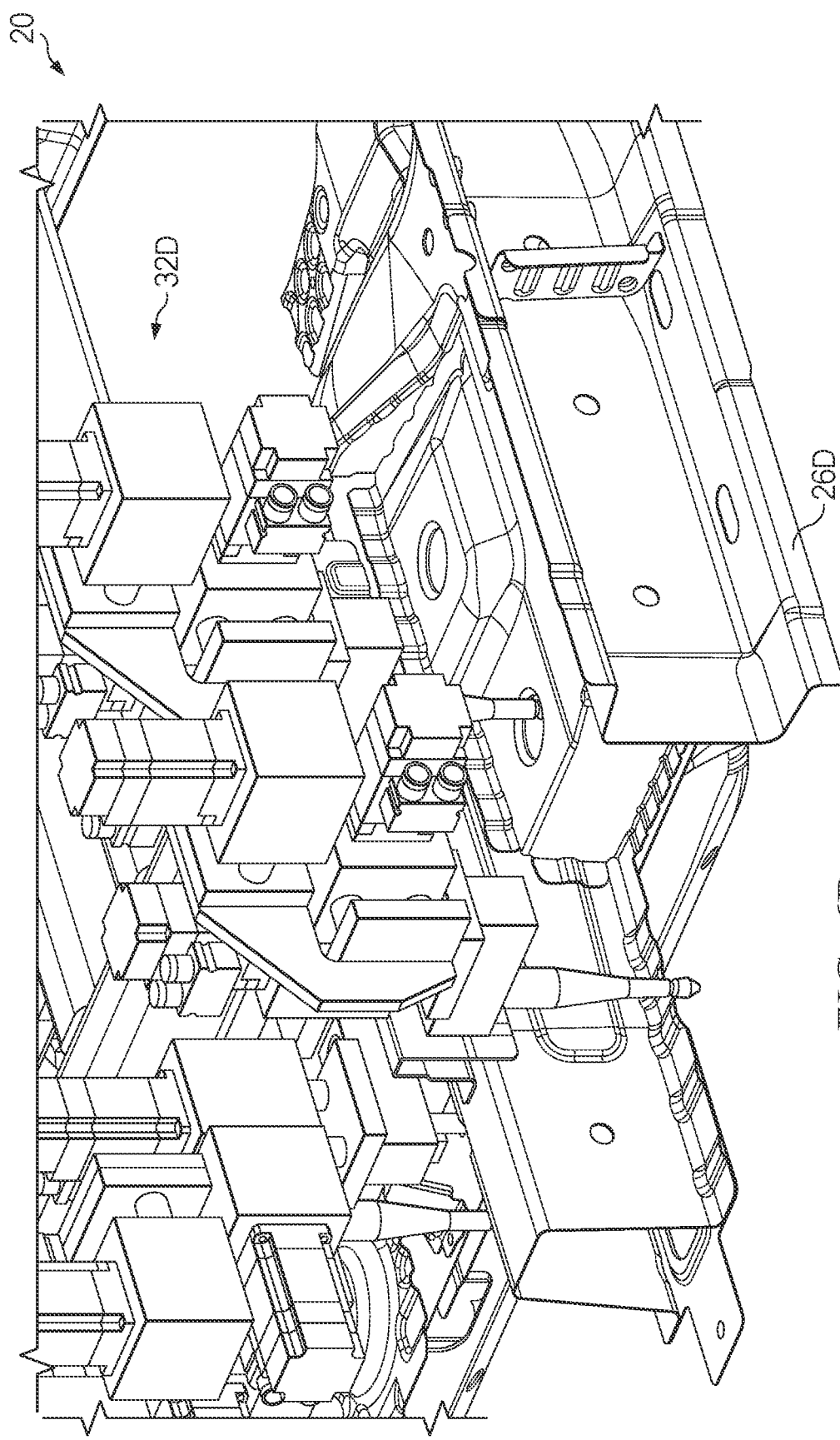
FIG. 6B is a perspective view of a portion of FIG. 6A.
Figure 6C:
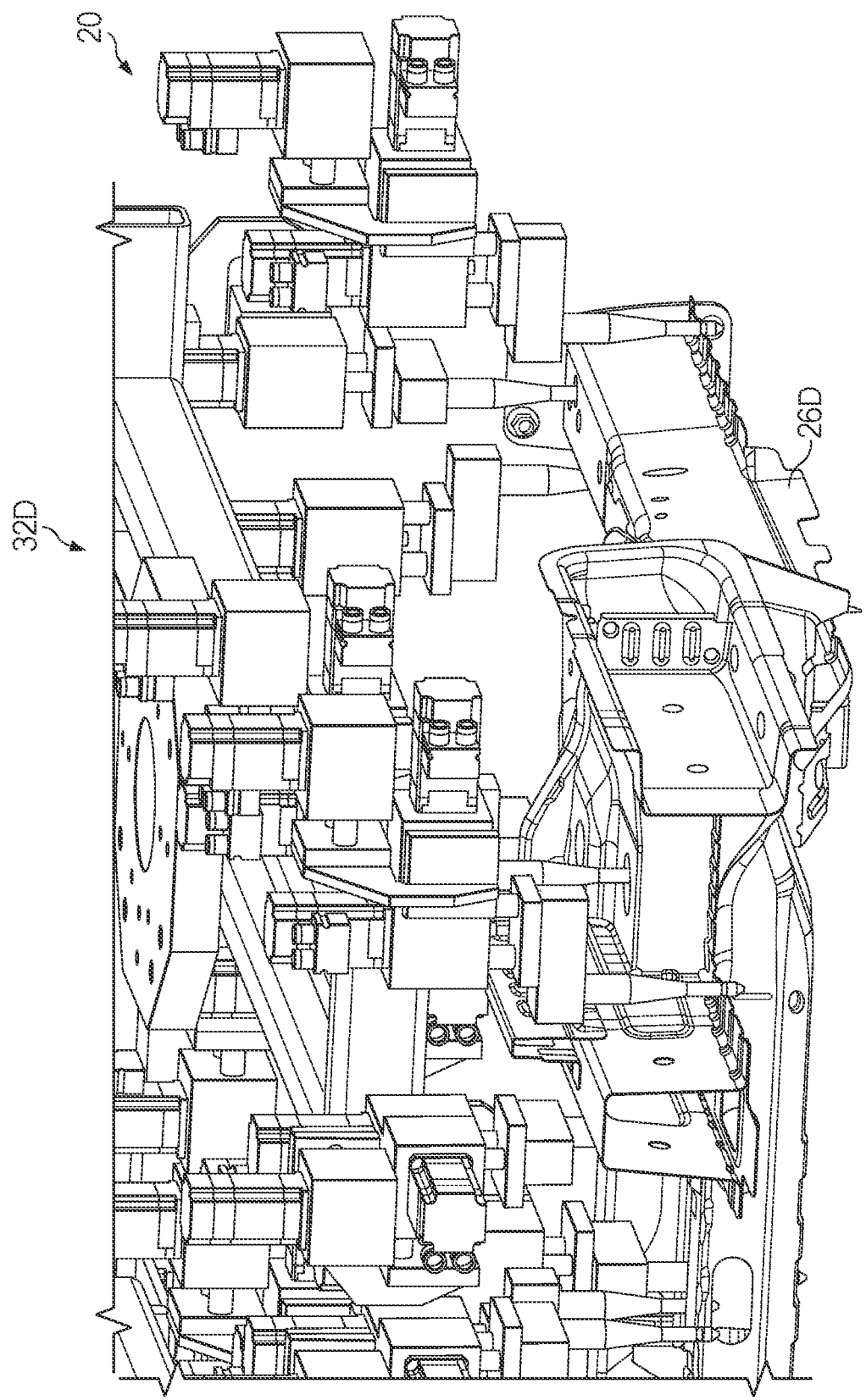
FIG. 6C is another perspective view of a portion of FIG. 6A.
Figure 6D:
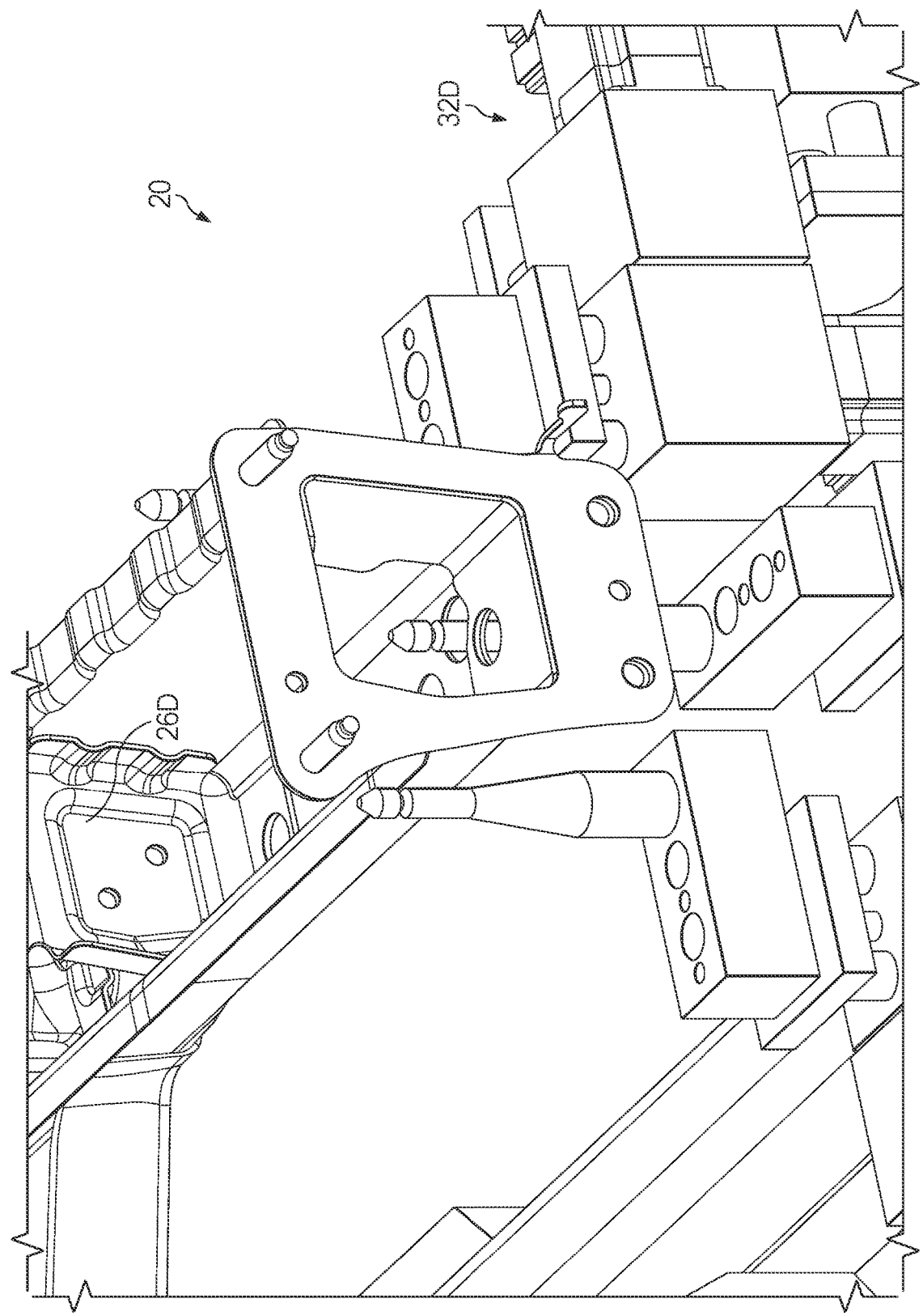
FIG. 6D is another perspective view of a portion of FIG. 6A.

FIG. 4 and FIG. 5 illustrate an exemplary material handling device 32 interacting with an exemplary part 26 of the exemplary subassembly 20. The material handling device 32 may comprise a number of gripping elements 50. The gripping elements 50 may be connected to one another through a framework of member 36. The gripping elements 50 may be configured to interact with various parts 26 of the subassembly 20. For example, without limitation, a given gripping element 50 may be placed within a locating aperture 19 on a part 26 of the subassembly 20. A second gripping element 50 and/or third gripping element 50 may be compressed against walls or other surfaces of the part 26 of the subassembly 20 to secure the part 26. In exemplary embodiments, the gripping elements 50 may be moved to various locations along the part 26 so as to provide a three-dimensional restraint against movement of the part 26. Edges of the part 26 may be located within the indent 54, though such is not required.

As illustrated with particular regard to FIG. 5, in exemplary embodiments a first protrusion 58A of a first gripping element 50A may be placed within a given locating aperture 19 of a given part 26 while a second protrusion 58B of a second gripping element 50B and a third protrusion 58C of a third gripping element 50C may be located on the walls of the part 26 on either side of the given locating aperture 19 to secure the part 26. The second and third protrusions 58B and 58C may compress the part 26 to secure the part 26 while the first protrusion 58A ensures accurate placement. The first protrusion 58A may be pushed out against one edge of the locating aperture 19 to help secure the part 26. Additional sets of gripping elements 50 may likewise be secured at other locating apertures 19 of the part 26. In this way, the part 26 may be secured so that the material handling robot 16 may move the material handling device 32, and thus the part 26.

FIG. 6A through FIG. 6D illustrates multiple material handling devices 32A-D interacting with multiple parts 26A-D to create the exemplary subassembly 20. While four material handling devices 32A-D and parts 26A-D are shown to create the exemplary subassembly 20, any number of material handling devices 32 and parts 26 are contemplated to form any kind of subassembly 20. Alternatively, a final assembly 20 may be formed. Each of the material handling devices 32 may be selectively mountable to the material handling robots 16. In this way, the various material handling robots 16 may handle a variety of material handling device 32. Each of the material handling devices 32 may likewise grip one or a number of different types of parts 26. In this way, many different types of parts 26 may be handled to create many different types of subassemblies 20 without the need to change hard point dedicated line tooling to change.

Figure 7:
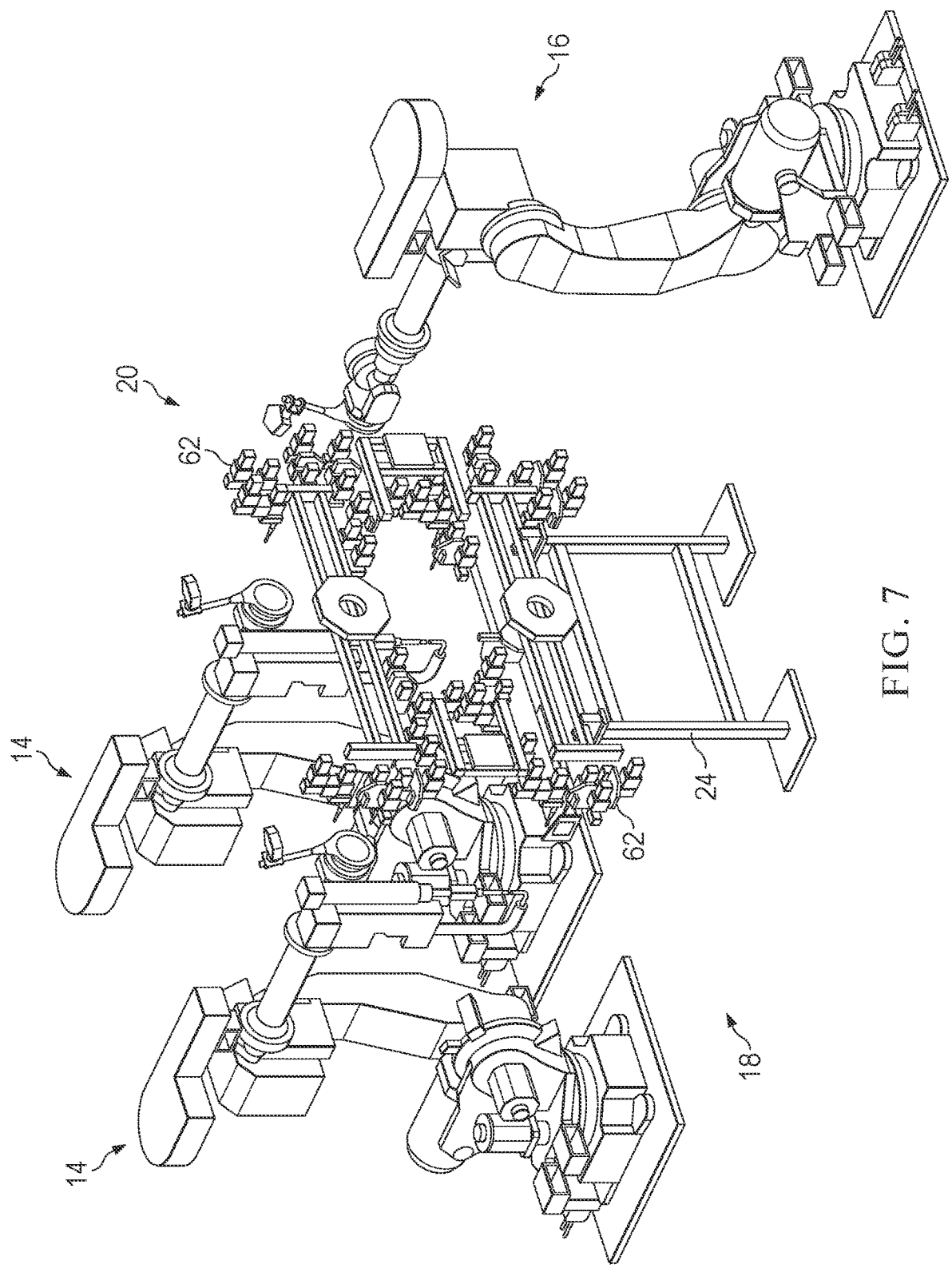
FIG. 7 is a perspective view of the system of FIG. 1 with certain material handling robots not illustrated so that the subassembly and material handling devices can be seen more clearly.

FIG. 7 illustrates an exemplary docking station 24. The docking station 24 may be configured for placement on the ground in the assembly area 18. Alternatively, or additionally, the docking station 24 may be secured to an AGV 28.

The docking station 24 may be configured to receive one or more parts 26 and/or material handling devices 32. In exemplary embodiments, a first material handling device 32 holding a first part 26 may be rested atop the docking station 24. Additional material handling devices 32, each with one or more parts 26, may be stacked or otherwise adjoined to the first material handling device 32 to create the subassembly 20. The material handling robots 16 may be configured to secure each of the material handling devices 32 at given positions within the assembly area 18. In other exemplary embodiments, once moved, the material handling devices 32 or parts 26 may rest in place such that the material handling devices 32 may be removed from the respective material handling robots 16. The use of the docking station 24 may assist with locating the subassembly 20. The docking station 24 may additionally, or alternatively, reduce the number of material handling robots 16 required. For example, without limitation, a single material handling robot 16 may be configured to grab and locate a number of material handling devices 32, each with one or more associated parts 26, and stack such parts 26 or material handling devices 32 on the docking station 24. It worth noting the docking station is optional and may not be used.

Figure 8:
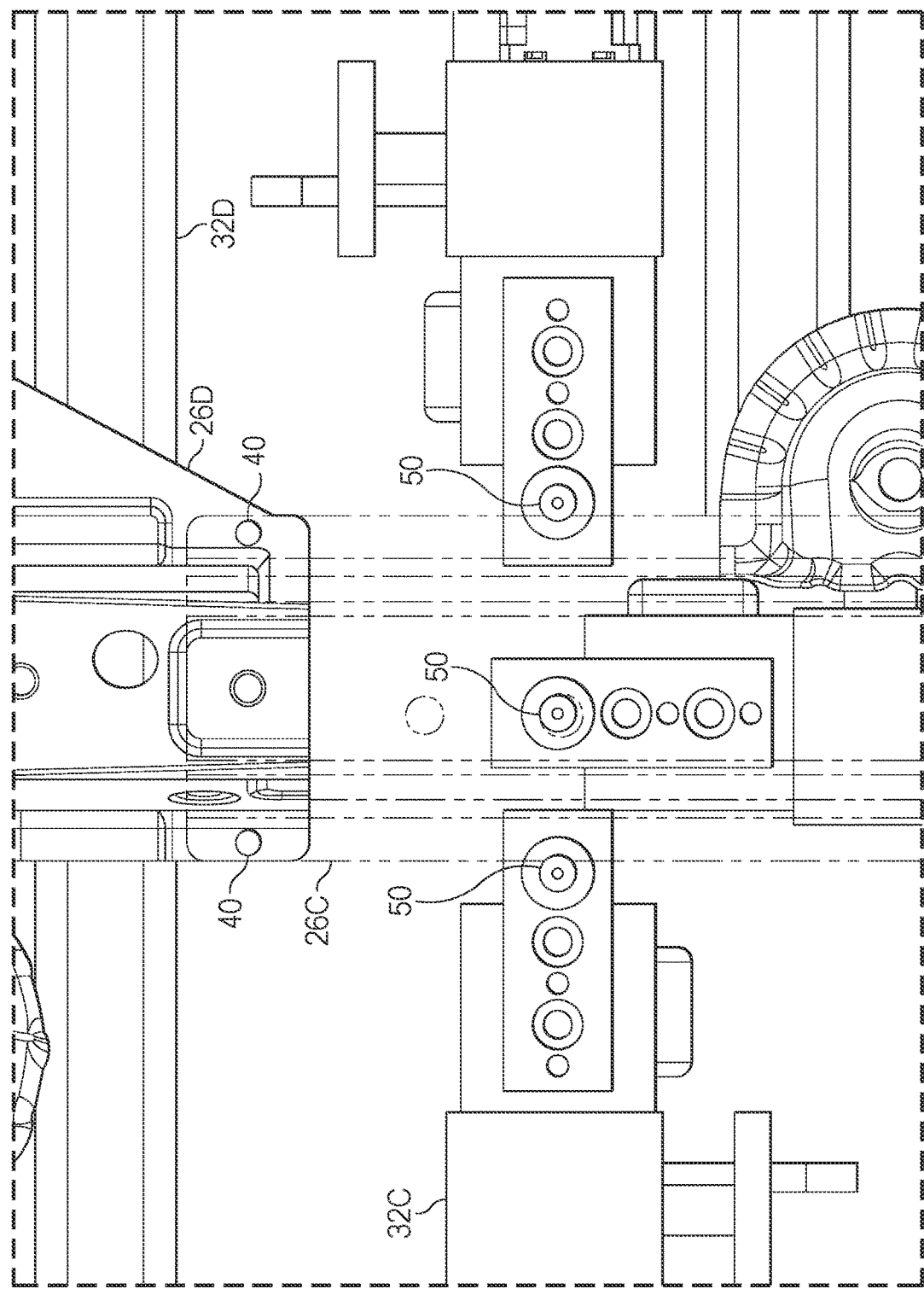
FIG. 8 is a detailed bottom view of detail B of FIG. 6A.

FIG. 8 illustrates exemplary datums 40. The datums 40 may be located at overlaps or adjoining areas between two parts 26D and 26C, though any number and location of datums 40 are contemplated. The datums 40 may be configured for recognition by the machine vision system 12. In exemplary embodiments, the datums 40 are ball shaped, though any type, shape, and size datums 40 are contemplated. Alternatively, or additionally, the datums 40 may comprise certain features of the parts 26 which are recognizable by the machine vision system 12.

Figure 9:
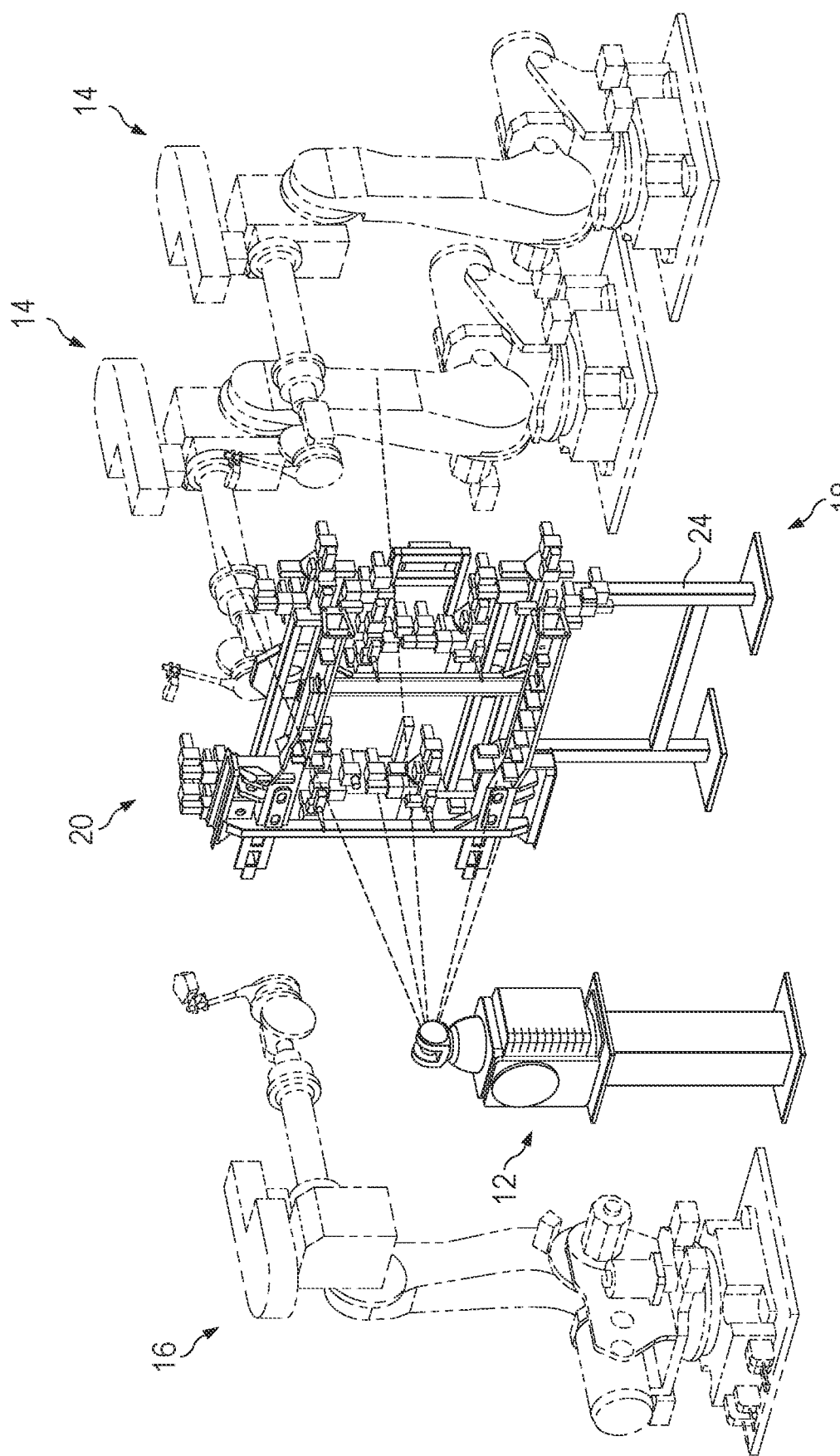
FIG. 9 is a perspective view of the AI driven reconfigurable manufacturing system of FIG. 7 also illustrating an exemplary machine vision system in use therewith.

FIG. 9 illustrates the machine vision system 12 locating the various datums 40. The machine vision system 12 may comprise executable software instructions stored on one or more electronic storage devices which when executed by one or more processors configure the machine vision system 12 to check for alignment of the various parts 26 of the subassembly 20. If further alignment is needed, the controller 30 may send appropriate instructions to the material handling robots 16. Another alignment scan may be performed to re-check alignment. When no further alignment is needed, the controller 30 may direct the joining robots 14 to begin joining the parts 26. The machine vision system 12 may transmit the location of the datums 40 from the last alignment scan to the controller 30 to instruct the joining robots 14. Alternatively, or additionally, such executable software instructions and related commands may be stored at the controller 30 and transmitted to the data store FIG. 12 for capability and trend analysis for example.

Figure 10:
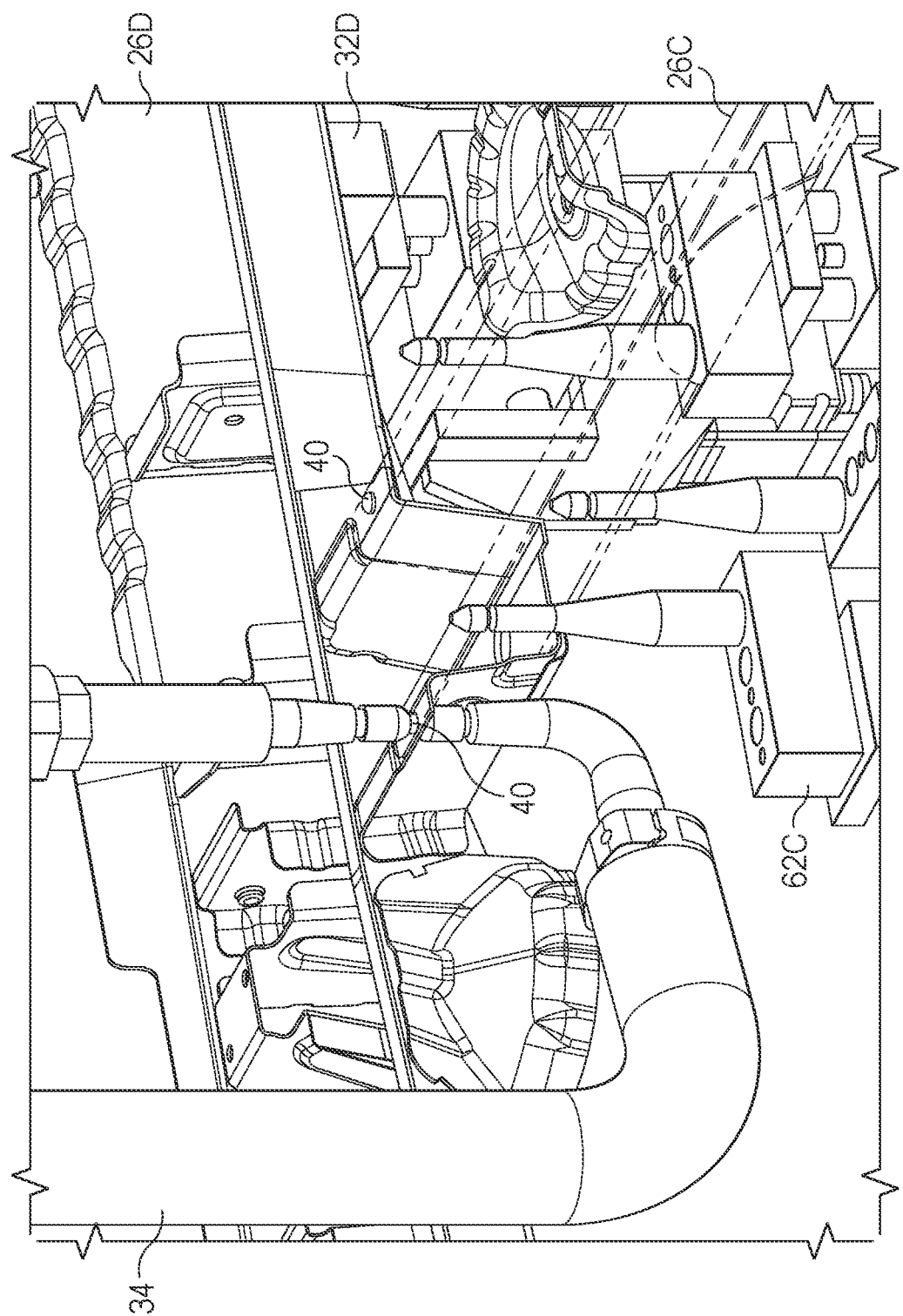
FIG. 10 is a detailed perspective view of FIG. 8 with a joining robot in use.

FIG. 10 illustrate the joining robots 14 beginning a weld. The joining robot 14 may be configured to begin a weld at a datum 40 and travel a specified distance in a specified direction, though such is not required. For example, without limitation, the joining robot 14 may be configured to instead begin a weld a specified distance in a specified direction from a datum 40. Any type of welding is contemplated such as, but not limited to, shielded metal arc welding, gas metal arc welding, flux cored arc welding, gas tungsten inert gas welding, some combination thereof, or the like. The weld may be made over a distance or spot welding may be provided. While welding is discussed, other forms of joining the parts 26 are contemplated such as, but not limited to, adhesion, fastening, riveting, crimping, brazing, soldering, shrink fitting, some combination thereof of the like and the joining robots 14 may be adapted for such purposes. Various joining device 34 may be utilized to perform such various types of joining. More than one type of joining may be performed.

Figure 11:
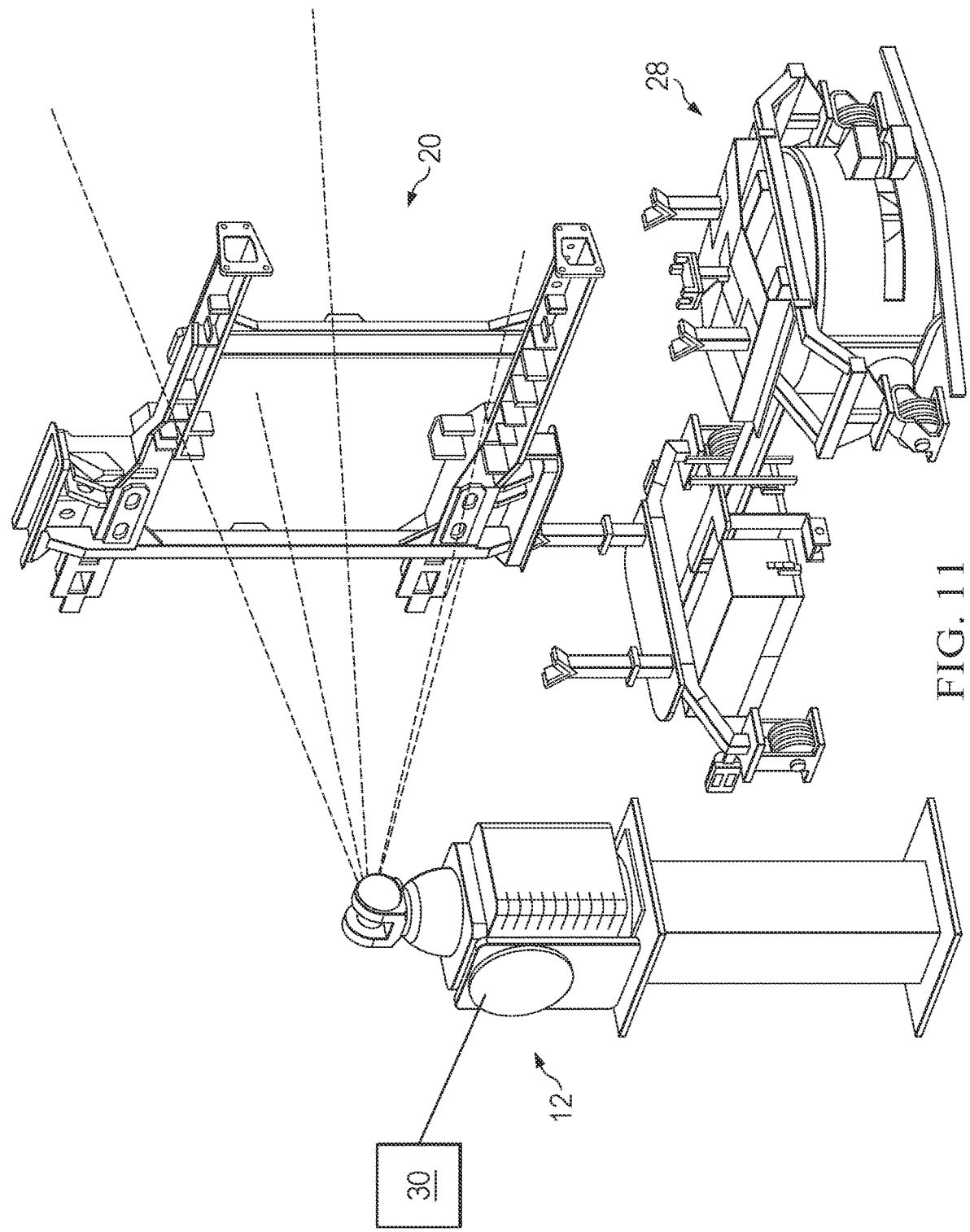
FIG. 11 is a perspective view of a completed subassembly undergoing an inspection scan and an exemplary AGV.

FIG. 11 illustrates an exemplary completed subassembly 20. Once the various parts 26 are joined, the various material handling device 32 may release their grip on the parts 26. The AGV can then move the subassembly to the next station in the process, until the assembly is done. The machine vision system 12 may perform an inspection scan of the completed subassembly 20. Any misalignment(s) may be reported to the controller 30. The subassembly 20 may be secured to an AGV 28 and removed from the assembly area 18, though any method of transportation is contemplated. Any size, shape, type, number, or the like of parts 26 are contemplated to form any size, shape, type, number, or the like subassembly 20.

Figure 12:
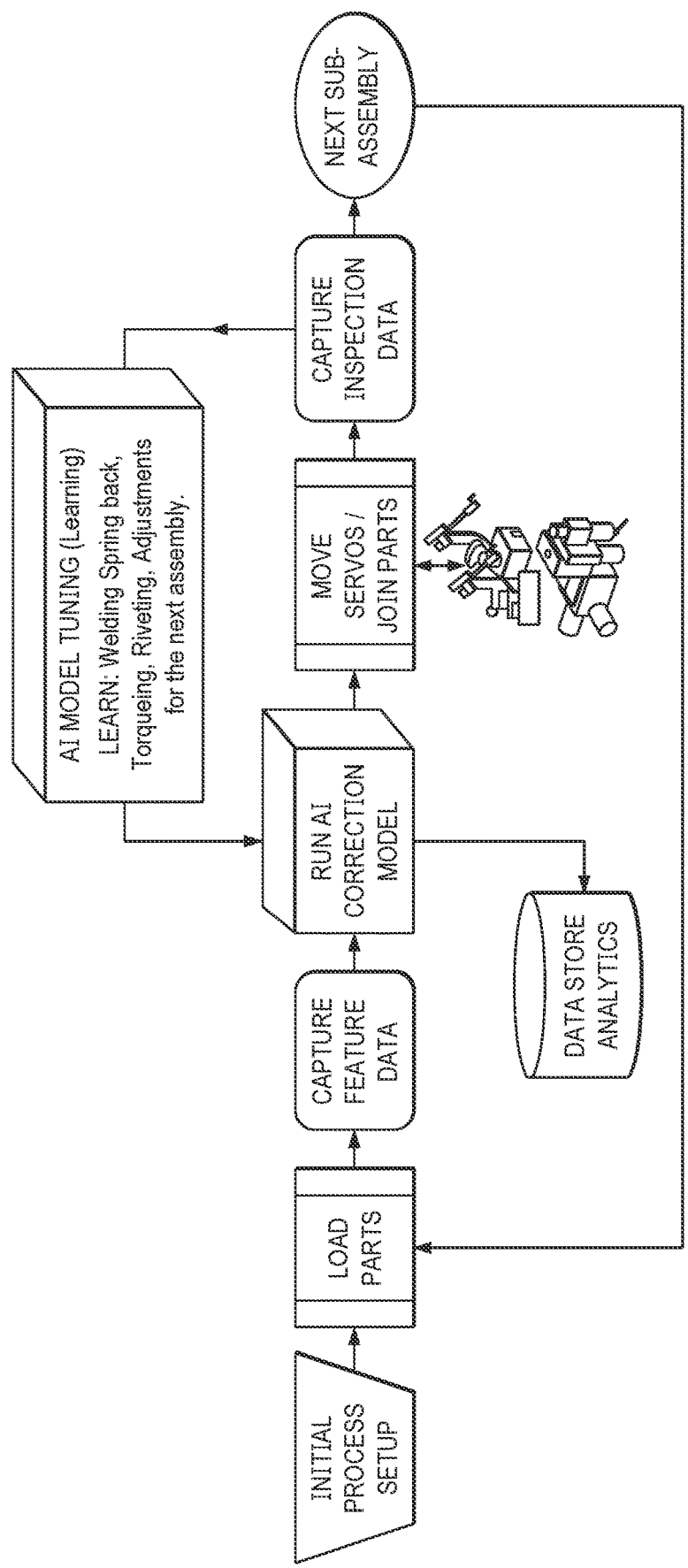
FIG. 12 is an exemplary flow diagram for the A.I. driven reconfigurable manufacturing process of the present invention.

FIG. 12 illustrates an exemplary flow diagram for the reconfigurable manufacturing system 10. The reconfigurable manufacturing system 10 may be configured to create any number of type of subassemblies 20 with only electronic reprogramming and minimal, if any, retooling or physical reconfiguration of the physical components. An initial set up process may be performed. The initial set up may include programming the AI algorithms with all virtual datums 40 for each subassembly 20 to be produced. This replaces the 3-2-1 traditional physical fixturing scheme. The initial set up may further comprise programming the controller 30 with commands configured to cause the material handling robots 16 and the material handling device 32 to secure and move the various parts 26, the machine vision system 12 to perform inspection, alignment, and/or identification scans, such as to determine the location of the datums 40, and the joining robots 14 to join the parts 26. The necessary parts 26 to create one or more subassemblies 20 may be provided. Preferably, such parts 26 are loaded in the one or more bins 22.

Each of the parts 26 may be subjected to an inspection scan to determine which part to grasp and/or verify that the correct part 26 has been grasped. Each part 26 may be subjected to an alignment scan such that the location of the datums 40 may be determined. The machine vision system 12 may transmit the location of such datums 40 to the controller 30. The controller 30 may compare the location of the scanned datums 40 with predetermined locations of virtual datums 40 to determine a best fit for the parts 26 to create the subassembly 20 stored at the learning A.I. software. The controller 30 may transmit instructions to the various material handling robots 16 and/or material handling devices 32 to place the parts into a best fit assembly position. Once the parts 26 are assembled into the subassembly 20, the machine vision system 12 may perform an alignment scan to capture the various datums 40 and verify that the proper positioning has been achieved. The parts 26 may be realigned as needed and subsequent alignment scans may be performed as needed. A correction model (learning AI algorithm) may optionally be run to compensate for lessons learned during creation of any prior subassemblies 20 including weld distortions, over torqueing and others. The material handling robots 16 may realign the parts 26 as required.

The joining robots 14 may join the parts 26 to create the subassembly 20. The material handling device 32 may be removed and the machine vision system 12 may perform an inspection scan the now joined subassembly 20. The learning A.I. software may execute a learning model. The learning model may compare the location of the datums 40 from the inspection scan against the expected position of the datums 40. The expected position of the datums 40 may be provided by the prior alignment scan(s), the stored virtual datums 40 for the subassembly 20, and/or inspection scans of previous subassemblies 20. The learning model may be configured to compensate for any differences by updating the virtual datums 40 to compensate for such differences. Such differences may arise from, for example without limitation, weld spring back, gravity, deflection, compliance, torqueing, riveting, some combination thereof, or the like. Such corrections may be performed by machine learning A.I. software. The process for determining the best fit, providing spatial adjustment, and compensating for differences may be as shown and described in U.S. Pat. No. 10,095,214 issued Oct. 9, 2018 and U.S. Pat. No. 10,101,725 issued Oct. 16, 2018, which are hereby incorporated by reference. The next subassembly 20 may begin production by repeating one or more of the aforementioned steps. The leaning model and/or the database may be located at the controller 30, though such is not required.

FIG. 13 through FIG. 18 illustrate another exemplary embodiment of the system 100 and related methods for operating the same. Similar elements may be numbered similarly but increased by 100 (e.g., 16 to 116). As shown with particular regard to FIG. 13, a worker 160 or other use may gather one or more parts 126 from various part storage tables 123 located within or adjacent to the assembly area 118. Alternatively, or additionally, such parts 126 may be gathered from bins 22. The worker 160 may carry one or more parts 126 in the assembly area 118. In other exemplary embodiments, such parts 126 may be picked up by material handling robots 116. Any number and type of parts 126 are contemplated to form any number or type of subassemblies 120.

The gathered parts 126 may be placed on a table 125, pallet or conveyor. The table 125 may be located near a center of the assembly area 118, though any location within the assembly area 18 is contemplated. Alternatively, or additionally, the parts 126 may be placed at the docking station 24. The assembly area 118 may be in view of a machine vision system 112. The machine vision system 112 may comprise one or more cameras, lasers, radar, proximity detectors, ultrasonic, photo eyes, some combination thereof, or the like. Any location, number, orientation, arrangement, and the like of components of the machine vision system 112 is contemplated.

Safety scanner mounted at the bottom of the table or another location in the cell may be configured to detect any workers 160 or other individuals in the assembly area 118. If a worker 160 or other person is in the assembly are 118, a controller 130 may be configured to prevent machine handling robots 116 from moving or halt the movement of any machine handling robots 116 in motion.

Figure 14:
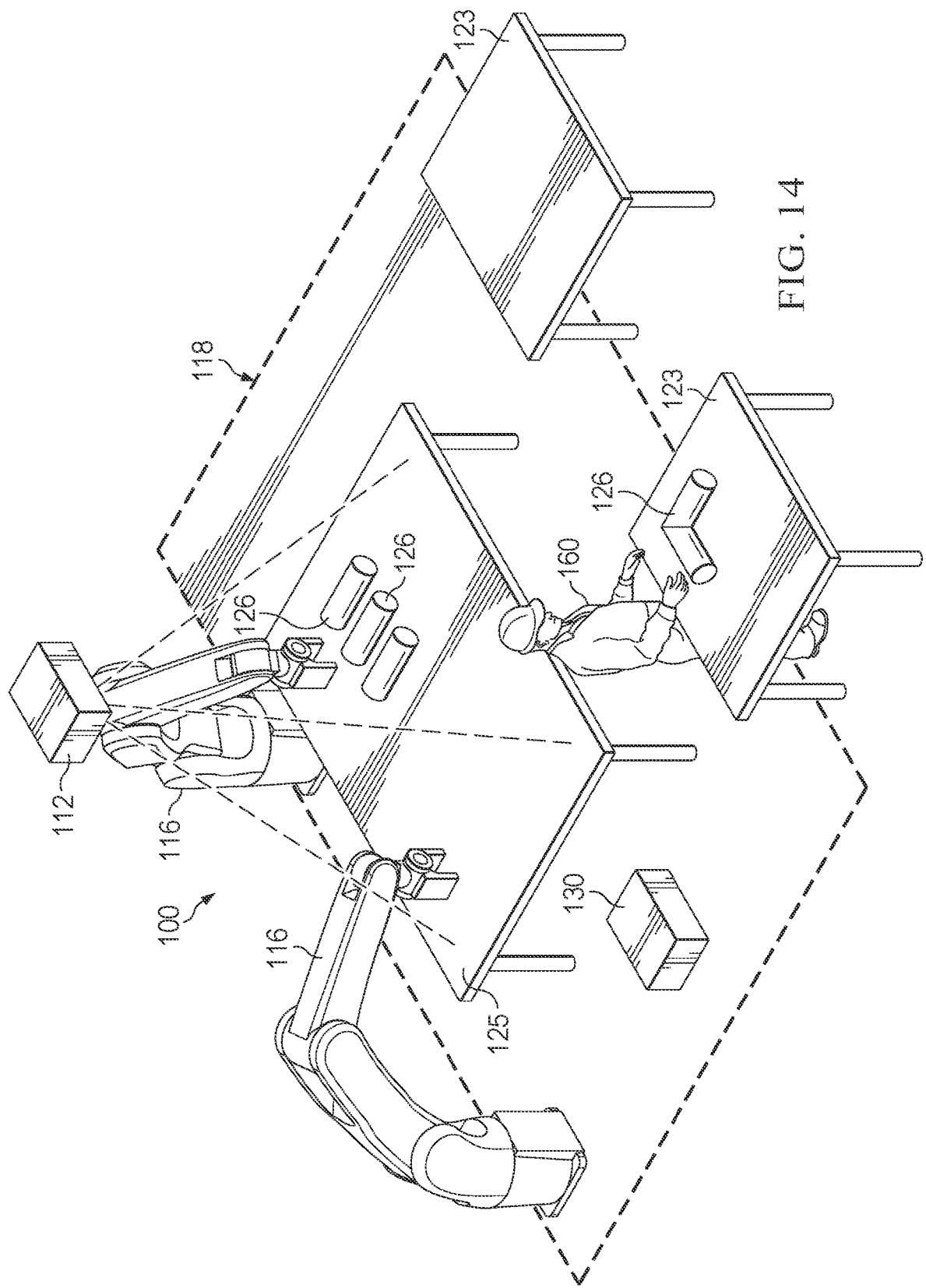
FIG. 14 is another perspective view of the system of FIG. 13.
Figure 15:
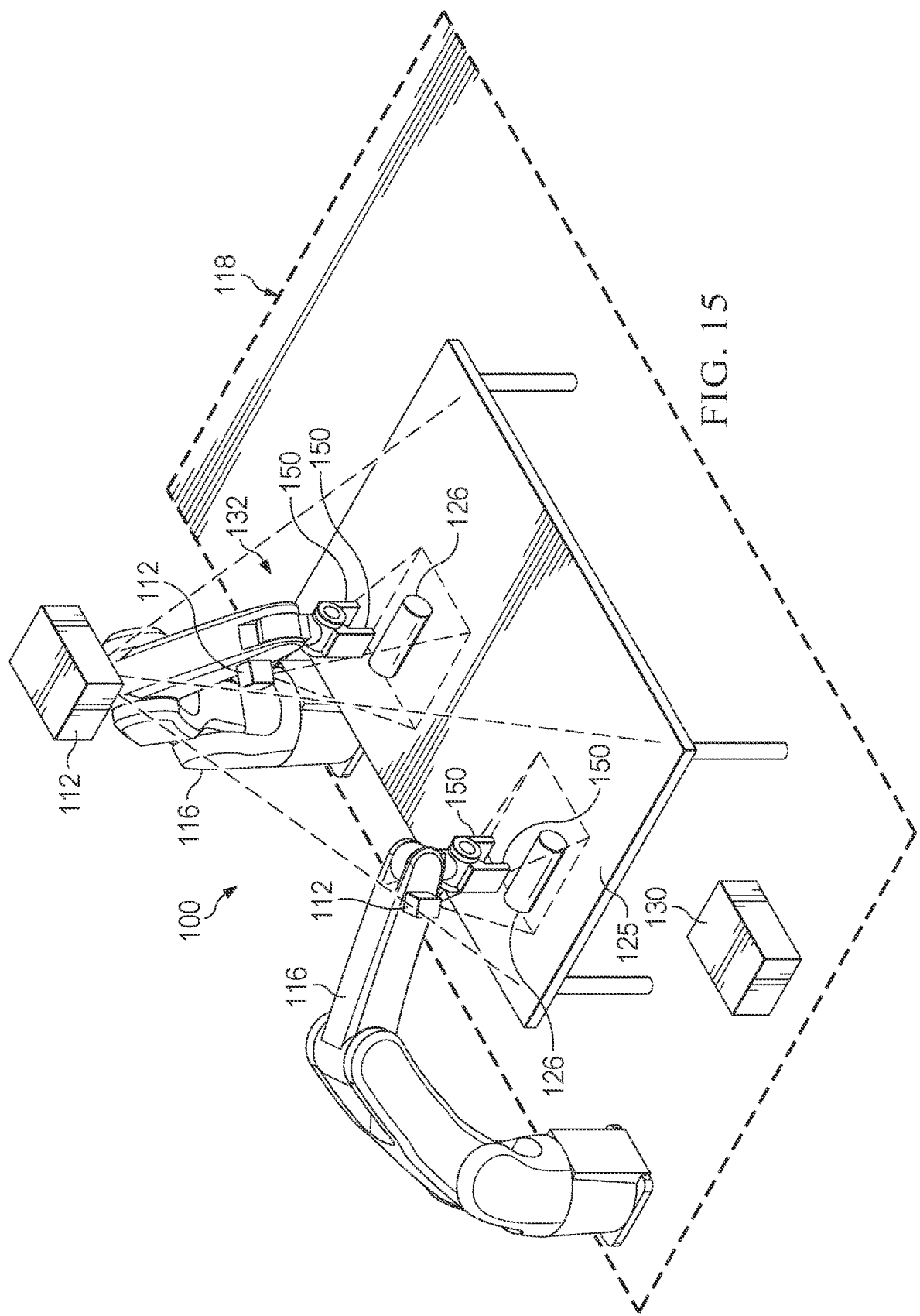
FIG. 15 is a detailed perspective view of the system of FIG. 13.

As shown with particular regard to FIG. 14, once the assembly area 118 is clear of workers 160 or other individuals, the controller 130 may signal the material handling robots 116 to begin or continue working. As shown with particular regard to FIG. 15, each of the material handling robots 116 may comprise a component of the machine vision system 112 which may be configured to perform an identification scan to identify and/or locate the parts 126 on the table for handling. In this way, the controller 130 may determine if the correct part 126 is being picked up as well as the location of such parts 126.

In exemplary embodiments, the component of the machine vision system 112 may be mounted to a material handling portion 132 of the material handling robot 116, though any number and location of components for the machine vision system 112 are contemplated. The various parts 126 may be grasped by the material handling portions 132 attached to the material handling robots 116. The material handling portions 132 may comprise claws, grippers, one or more gripping elements 150, vacuum systems, suction cups, some combination thereof, or the like. Any kind or type of material handling portion 132 configured to handle any shape or type of part 126 is contemplated. Each of the material handling portions 132 may be configured to handle a number of differently shaped parts 126.

Figure 16:
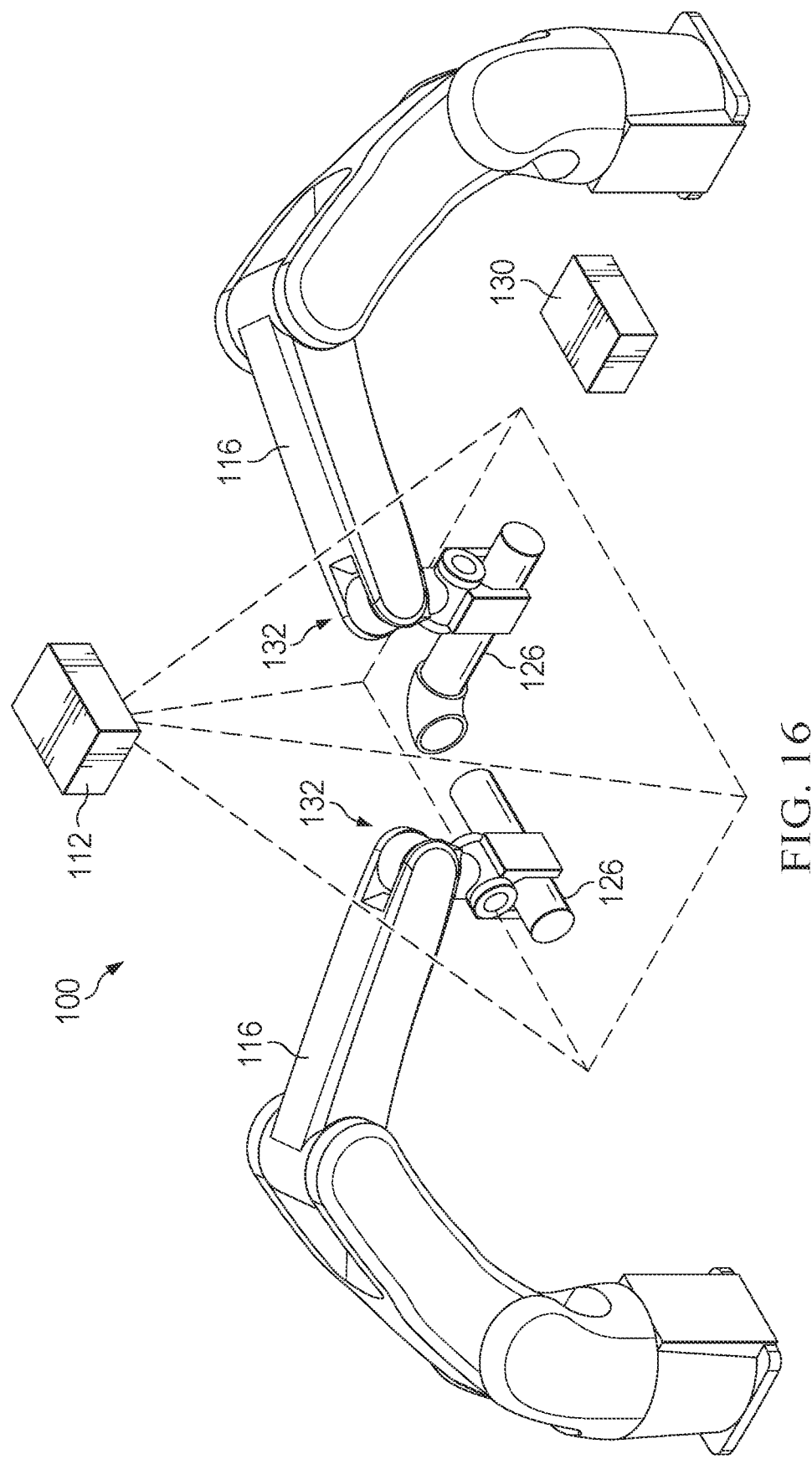
FIG. 16 another detailed perspective view of the system of FIG. 13.

As shown with particular regard to FIG. 16, each of the material handling robots 116 may move each of the parts 126 within view of the same or another component of the machine vision system 112, which may be configured to perform a first or additional identification scan to identify and/or locate the parts 126 within the assembly area 118. The parts 126 may be moved into an inspection position as needed.

The machine vision system 112 may be configured to perform an alignment scan. The alignment scan may confirm the location of the parts 126 within the assembly area 118. The identification and/or alignment scans may be made of various datums 140 on the parts 126. The datums 140 may be recognizable features of the parts 126. Such features may include, for example without limitation, apertures, edges, curved surfaces, protrusions, depressions, some combination thereof, or the like. The position of the datums 140 may be compared against stored, virtual datums 140 at the learning A.I. software of the controller 130. The learning A.I. software of the controller may utilize machine learning A.I. software to determine the best fit for the parts 126 to create the subassembly 120. The position of the parts 126 may be adjusted as needed to match the virtual datums 140. As shown in FIG. 16, the actual position of the parts 126 may be slightly different that the desired position for assembly and inspection. The ghosted image of the parts 126 in FIG. 16 may indicate an exemplary position of the parts 126 in accordance with the virtual datums 140.

Figure 17:
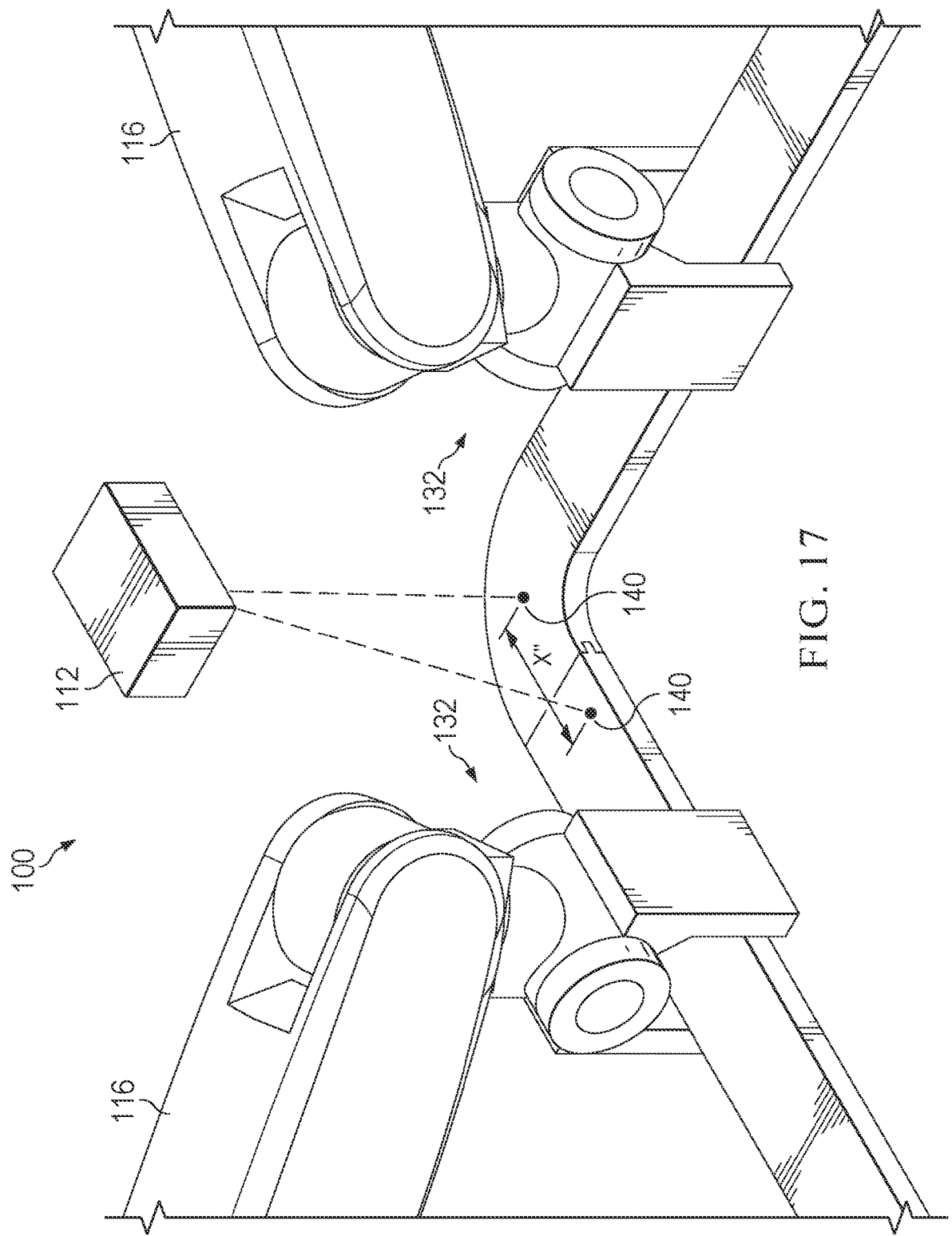
FIG. 17 another detailed perspective view of the system of FIG. 13.

As shown with particular regard to FIG. 17, the material handling robots 116 may move the parts 126 into an assembly position to form a subassembly 120. The machine vision system 112 may perform an inspection scan of the subassembly. The inspection scan may be made of the various datums 140 on the parts 126. The location, number, and type of datums 140 illustrated in FIG. 17 is merely exemplary and is not intended to be limiting. Any number, type, and location of datums 140 for performing any kind of inspection scan and related measurements or determinations is contemplated. The controller 130 may be configured to determine if the location of the datums 140 in the inspection scan matches the virtual datums 140. If a match is made, or is within a predetermined margin of error, the parts may be accepted. If a match is not made, or the results are outside of a predetermined margin of error, the parts may be rejected. If a part is accepted, it may be joined. The process for determining the best fit and providing spatial adjustment may be as shown and described in U.S. Pat. No. 10,095,214 issued Oct. 9, 2018 and U.S. Pat. No. 10,101,725 issued Oct. 16, 2018, which are hereby incorporated by reference. If the part is rejected, the discrepancies may be transmitted to a learning module which may utilize the learning A.I. software to compensate for such discrepancies by adjusting the location for the virtual datums 140 for the subassemblies 120. The use of material handling robots 116 and material handling devices 132 to secure the parts 126 may provide a fixtureless assembly process. By storing the virtual datums 140, the need for a physical fixture to provide physical datum points may be eliminated.

In exemplary embodiments, all tasks may be sequenced using Common Object Request Broker Architecture (COBRA) to interact with COBRA actions, though any type or kind of programming language is contemplated. While subassemblies are discussed, it is contemplated that such subassemblies may be final assemblies as well.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

What is claimed is:

1. A method for reconfigurable, fixtureless manufacturing, said method comprising:
 grasping, by way of a first material handling robot, a first part, wherein the first material handling device is adapted for programmable movement within an assembly area;
 moving, by way of the first material handling robot, the first part to a first location within the assembly area;
 grasping, by way of a second material handling robot, a second part, wherein the second material handling device is adapted for programmable movement within assembly area;
 moving, by way of the second material handling robot, the second part to a second location within the assembly area such that the second part adjoins the first part in a predetermined orientation;
 while said first part and said second part remain grasped by said first material handling robot and said second material handling robot, respectively, in a manner which otherwise suspends said first part and said second part within the assembly area and out of contact with any fixtures, work surfaces, jigs, and locators:
  performing an alignment scan, by way of the machine vision system, of the first part and the second part to determine locations of datums on the first part and the second part;
  transmitting the locations of the datums to a controller;
  comparing, by way of software, the location of the datums relative to stored virtual datums for a subassembly comprising the first part and the second part joined together;
   transmitting, by way of the controller, the location of the datums to a joining robot;
   joining the first part to the second part by way of the joining robot to form the subassembly; and
   performing an inspection scan, by way of the machine vision system, of the datums on the first part and the second part after joining the first part to the second part.

2. The method of claim 1 further comprising:
 comparing, by way of the software, the location of the datums from the inspection scan to the virtual datums to reveal discrepancies; and
 adjusting, by way of the software stored at the controller, the position of the virtual datums to compensate for discrepancies.

3. The method of claim 1 wherein:
 the controller is located at one or more of: the machine vision system, embedded at an industrial PC, camera head, robot, or manipulator motion controller directly embedded in the material handling robot.

4. The method of claim 1 wherein:
 the joining robot is configured to join the first part to the second part by welding.

5. The method of claim 1 further comprising:
 determining that the location of at least some of the datums as determined during the alignment scan is different from the location of corresponding one or ones of the virtual datums by more than a predetermined margin;
 realigning the first part relative to the second part by way of the first or second material handling robot to match the location of the virtual datums with the location of the datums;
 performing a second alignment scan, by way of the machine vision system, of the datums on the first part and the second part; and
 comparing, by way of the software, the location of the datums from the second alignment scan to the virtual datums.

6. The method of claim 1 further comprising:
 securing the first part and the second part by activating brakes on the first material handling robot and the second material handling robot when performing the alignment scan and the inspection scan.

7. The method of claim 1 wherein:
 the machine vision system comprises a laser, structured light, or optics.

8. The method of claim 1 wherein:
 the machine vision system comprises multiple cameras which are physically disbursed.

9. The method of claim 1 further comprising:
 comparing and shortening, by way of the controller, test vectors using an iterative and priority-based algorithm to relatively position the first and second parts based, at least in part, on the locations of the datums gathered from the alignment scan and the virtual datums; and
 commanding at least one of the material handling robots to move in a manner which adjusts the first and second parts relative to one another such that at least certain of the locations of the datums are in closer alignment with at least certain of the virtual datums associated with a higher priority.

10. A reconfigurable manufacturing system, said system comprising:
 one or more material handling robots;
 a joining robot;
 a machine vision system positioned to view at least a portion of an assembly area, where said one or more material handling robots and said joining robot are located at said assembly area;
 one or more controllers comprising one or more processors, one or more electronic storage devices comprising software instructions, which when executed, configure the one or more processors to:
  command at least one of the one or more material handling robots to grasp a first part and move the first part within the assembly area in view of the machine vision system;
  command at least one of the one or more material handling robot to grasp said second part and move the second part within the assembly area in view of the machine vision system;

while said first and second parts remain otherwise suspended within the assembly area and out of contact with any fixtures, work surfaces, jigs, and locators:
  command the machine vision system to perform an alignment scan of datums on the first part;
  command the machine vision system to perform an alignment scan of datums on the second part;
  compare the location of the datums from the alignment scan with virtual datums;
  command at least one of the one or more material handling robots to move the first part into an assembly position relative to the second part; and
  command the joining robot to join the first part to the second part to create a first subassembly.

11. The system of claim 10 wherein:
said one or more controllers comprise additional software instructions stored at said one or more electronic storage devices, which when executed, configure the one or more processors to:
  command the machine vision system to perform an inspection scan of the datums of first subassembly;
  compare the datums from the inspection scan of the first subassembly to the virtual datums to determine discrepancies; and
  update the location of the virtual datums to compensate for said discrepancies.

12. The system of claim 10 further comprising:
one or more autonomous guided vehicles (AGVs), wherein said one or more controllers comprise additional software instructions stored at said one or more electronic storage devices, which when executed, configure the one or more processors to:
determine a position of the first subassembly at the AGV within the assembly area by way of the machine vision system;
command at least one of the one or more the material handling robots to move the first subassembly to at least one of the one or more AGVs;
direct movement of said AGV, at least in part, based upon said position; and
command the AGV to leave the assembly area.

13. The system of claim 10 wherein:
said one or more controllers comprise additional software instructions stored at said one or more electronic storage devices, which when executed, configure the one or more processors to communicate directly with said material handling robots to cause the material handling robots to move differently from pre-taught positions when placing the parts.

14. The system of claim 10 wherein:
said controller comprises additional software instructions stored on the one or more electronic storage devices, which when executed, configure the one or more processors to:
  compare and shorten test vectors using an iterative and priority-based algorithm to relatively position the first and second parts based, at least in part, on the locations of the datums gathered from the alignment scan and the virtual datums; and
  command at least one of the material handling robots to move in a manner which adjusts the first and second parts relative to one another such that at least certain of the locations of the datums are in closer alignment with at least certain of the virtual datums associated with a higher priority.

15. A fixtureless, artificial intelligence ("AI") assisted reconfigurable manufacturing system, said system comprising:
material handling robots located at an assembly area;
a machine vision component system comprising components positioned to view the assembly area;
a controller comprising one or more processors, one or more electronic storage devices, and executable software instructions stored on the one or more electronic storage devices, which when executed, configure the one or more processors to:
  command the material handling robots to grasp different parts;
  command the material handling robots to move the grasped parts adjacent one another within the assembly area to form a partially completed subassembly;
  while the partially completed subassembly remains otherwise suspended within the assembly area and out of contact with any fixtures, work surfaces, jigs, and locators:
    perform, by way of the machine vision system, a scan of the partially completed subassembly to identify datums of the parts;
    reject the partially completed subassembly if the scan reveals one or more datum locations different from corresponding virtual datums by more than a margin of error; and
    join each of the gasped parts of the partially completed subassembly to one another to form a completed subassembly if the inspection scan reveals the locations of each of the datums to match or be within the margin of error of the locations of the corresponding virtual datums.

16. The system of claim 15 wherein:
said controller comprises additional software instructions stored on the one or more electronic storage devices, which when executed, configure the one or more processors to:
  trend and analyze data related to multiple iterations of generating the partially complete subassembly and the completed subassembly; and
  generate one or more graphical displays of the trended and analyzed data by way of a datastore analytics database.

17. The system of claim 15 wherein:
said controller comprises additional software instructions stored on the one or more electronic storage devices, which when executed, configure the one or more processors to adjust for and mitigate weld distortion.

18. The system of claim 15 wherein:
said controller comprises additional software instructions stored on the one or more electronic storage devices, which when executed, configure the one or more processors to adjust for joining material springback.

19. The system of claim 15 wherein:
said controller comprises additional software instructions stored on the one or more electronic storage devices, which when executed, configure the one or more processors to provide digital corrections to said virtual datums, wherein said digital corrections are configured to create nominal offset changes.

20. The system of claim 15 wherein:
said controller comprises additional software instructions stored on the one or more electronic storage devices, which when executed, configure the one or more processors to, upon rejection of the partially completed subassembly and while the partially completed subassembly remains otherwise suspended within the assembly area and out of contact with any fixtures, work surfaces, jigs, and locators:

compare and shorten test vectors using an iterative and priority-based algorithm to relatively reposition the first and second parts based, at least in part, on the locations of the datums gathered from the scan of the first and second parts and the virtual datums; and command at least one of the material handling robots to move in a manner which adjusts the first and second parts relative to one another such that at least certain of the locations of the datums are in closer alignment with at least certain of the virtual datums associated with a higher priority.

* * * * *